(12) United States Patent
Eheim et al.

(10) Patent No.: US 11,532,910 B2
(45) Date of Patent: Dec. 20, 2022

(54) CONTACT DEVICE, CONTACT SYSTEM AND METHOD FOR ASSEMBLING SUCH A CONTACT SYSTEM

(71) Applicant: TE Connectivity Germany GmbH, Bensheim (DE)

(72) Inventors: Manuel Eheim, Bensheim (DE); Alexander Weber, Bensheim (DE); Chris Buechling, Bensheim (DE); Uwe Uster, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/177,621

(22) Filed: Feb. 17, 2021

(65) Prior Publication Data

US 2021/0257777 A1 Aug. 19, 2021

(30) Foreign Application Priority Data

Feb. 19, 2020 (DE) ...................... 10 2020 104 410.0

(51) Int. Cl.
*H01R 13/622* (2006.01)
*H01R 13/502* (2006.01)
(Continued)

(52) U.S. Cl.
CPC ......... *H01R 13/622* (2013.01); *H01R 13/502* (2013.01); *H01R 43/26* (2013.01); *B60R 16/03* (2013.01); *H01R 2201/26* (2013.01)

(58) Field of Classification Search
CPC .... H01R 13/447; H01R 13/44; H01R 13/621; H01R 13/6215; H01R 2101/00;
(Continued)

(56) References Cited

U.S. PATENT DOCUMENTS 2,688,105 A * 8/1954 Hasselhorn ........ H01R 13/6666
313/51
3,960,427 A * 6/1976 Piaget ...................... H01R 4/70
439/147

(Continued)

FOREIGN PATENT DOCUMENTS

DE 1961792 A1 6/1971
DE 9412245 U1 11/1994
(Continued)

OTHER PUBLICATIONS

Extended European search report in Appln. No. 21157954.5-1201, dated Jun. 30, 2021, 11 pp.
(Continued)

*Primary Examiner* — Gary F Paumen
(74) *Attorney, Agent, or Firm* — Barley Snyder

(57) ABSTRACT

A contact device includes a housing having a housing interior, a screw having a screw head and a shaft connected to the screw head, the shaft extending along a screw axis and having a first thread, a screw locking device connecting the screw head to the housing by a force-based and/or an interlocking engagement, and a first contact element for contacting a second contact element of a further contact device. The first contact element and the screw are arranged in the housing interior.

20 Claims, 17 Drawing Sheets

(51) Int. Cl.
*H01R 43/26* (2006.01)
*B60R 16/03* (2006.01)

(58) Field of Classification Search
CPC .. H01R 2201/26; H01R 13/622; H01R 13/502;
H01R 43/26; H01M 2/20; B60R 16/03
USPC ................................................ 439/801, 680
See application file for complete search history.

(56) References Cited

U.S. PATENT DOCUMENTS

| | | | |
|---|---|---|---|
| 4,683,390 A * | 7/1987 | Imori | H02K 11/046 |
| | | | 310/71 |
| 10,381,752 B2 * | 8/2019 | Kaehny | H01R 11/11 |
| 2006/0039773 A1 | 2/2006 | Tanimura | |
| 2018/0069341 A1 * | 3/2018 | Sakaguchi | H01R 9/18 |
| 2018/0375227 A1 | 12/2018 | Kaehny et al. | |

FOREIGN PATENT DOCUMENTS

| | | |
|---|---|---|
| DE | 60218910 T2 | 12/2007 |
| DE | 102017210425 A1 | 12/2018 |
| JP | 2017092015 A | 5/2017 |
| WO | 2018102417 A1 | 6/2018 |

OTHER PUBLICATIONS

Abstract of DE 1961792(A1), dated Jun. 16, 1971, 1 p.
Machine translation of JP 2017092015A, dated Jun. 23, 2021, 7 pp.

\* cited by examiner

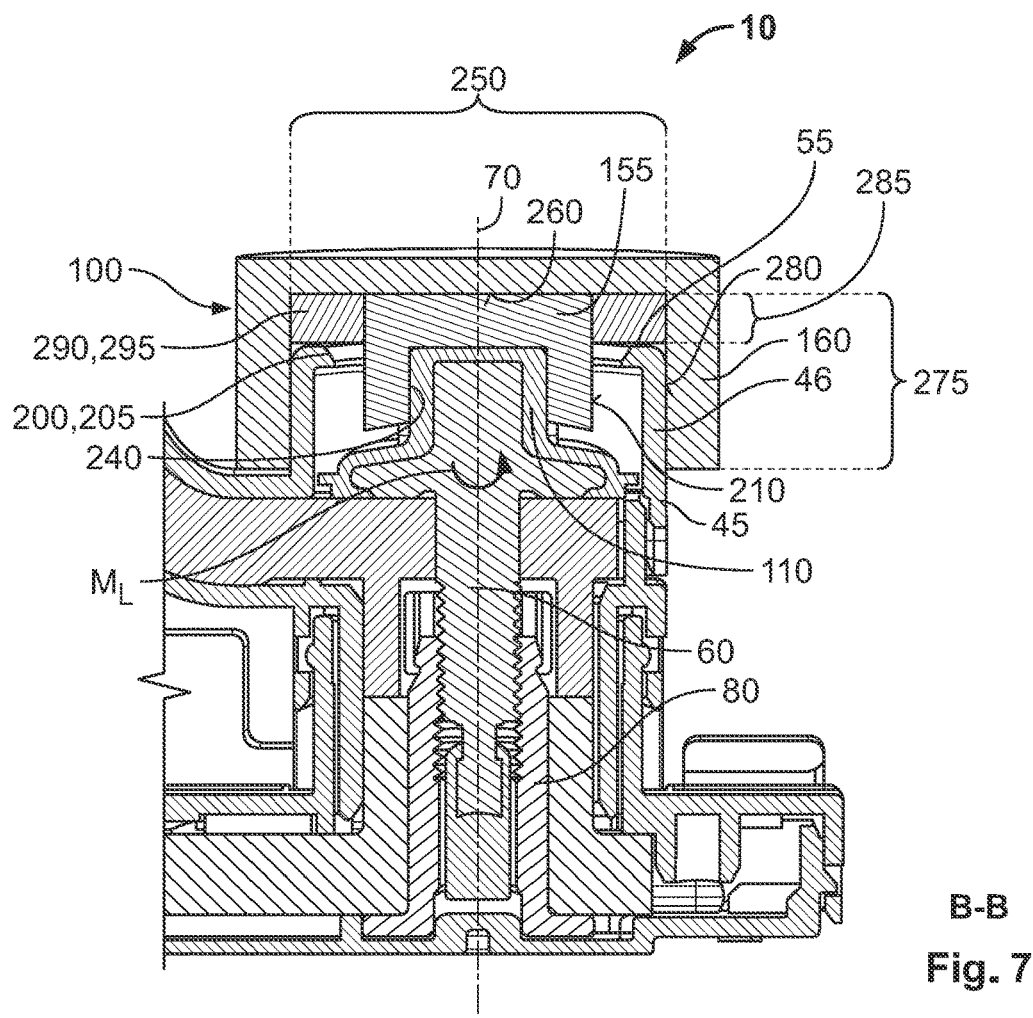
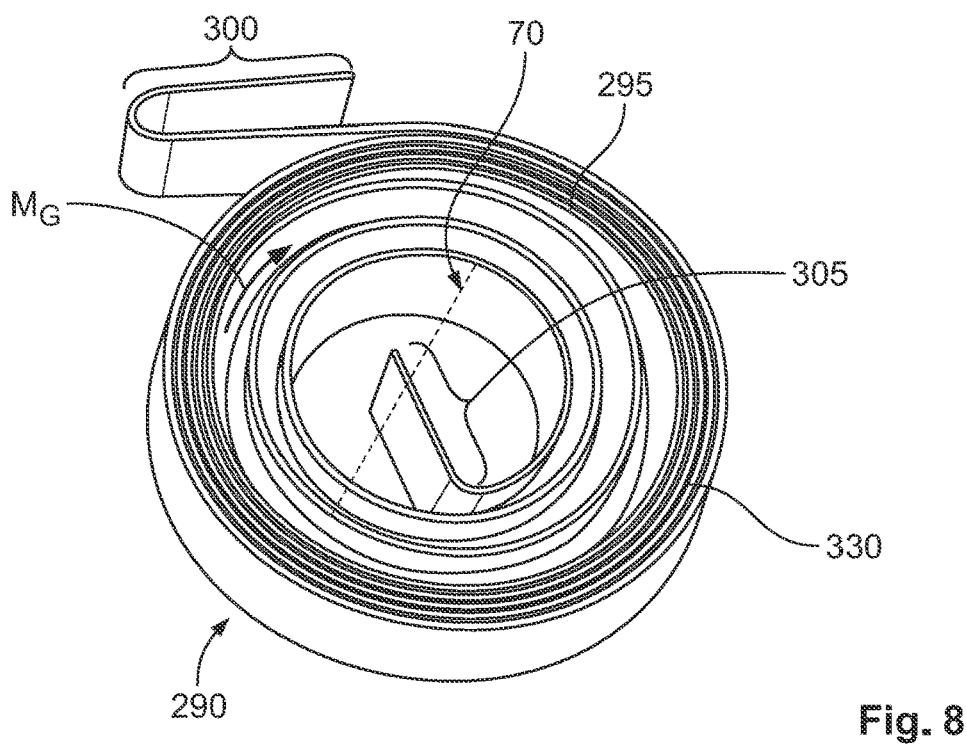
B-B
Fig. 7
Fig. 8

CONTACT DEVICE, CONTACT SYSTEM AND METHOD FOR ASSEMBLING SUCH A CONTACT SYSTEM

CROSS-REFERENCE TO RELATED APPLICATION

This application claims the benefit of the filing date under 35 U.S.C. § 119(a)-(d) of German Patent Application No. 102020104410.0, filed on Feb. 19, 2020.

FIELD OF THE INVENTION

The present invention relates to a contact device and, more particularly, to a contact device having a screw.

BACKGROUND

A contact system having a contact device and a further contact device is known, wherein the contact device has a first contact element and the further contact device has a second contact element. In order to secure the first contact element to the second contact element, the contact device can have a screw and the further contact device can have a threaded bush, wherein the screw is screwed with a shaft into the threaded bush. The screw presses the first contact element against the second contact element.

This configuration is suitable in particular for high-current contact devices in motor vehicles. However, the screw can unintentionally come loose over the lifetime of the motor vehicle as a result of vibrations in the motor vehicle, and it is difficult to secure the screw against the loosening.

SUMMARY

A contact device includes a housing having a housing interior, a screw having a screw head and a shaft connected to the screw head, the shaft extending along a screw axis and having a first thread, a screw locking device connecting the screw head to the housing by a force-based and/or an interlocking engagement, and a first contact element for contacting a second contact element of a further contact device. The first contact element and the screw are arranged in the housing interior.

BRIEF DESCRIPTION OF THE DRAWINGS

The invention will now be described by way of example with reference to the accompanying Figures, of which:

FIG. 7 is a sectional side view of a contact system according to another embodiment;

FIG. 8 is a perspective view of a clamping element of the contact system of FIG. 7;

DETAILED DESCRIPTION OF THE EMBODIMENT(S)

Features and exemplary embodiments as well as advantages of the present disclosure will be explained in detail with respect to the drawings. It is understood that the present disclosure should not be construed as being limited by the description of the following embodiments. It should furthermore be understood that some or all of the features described in the following may also be combined in alternative ways.

Figure 1:
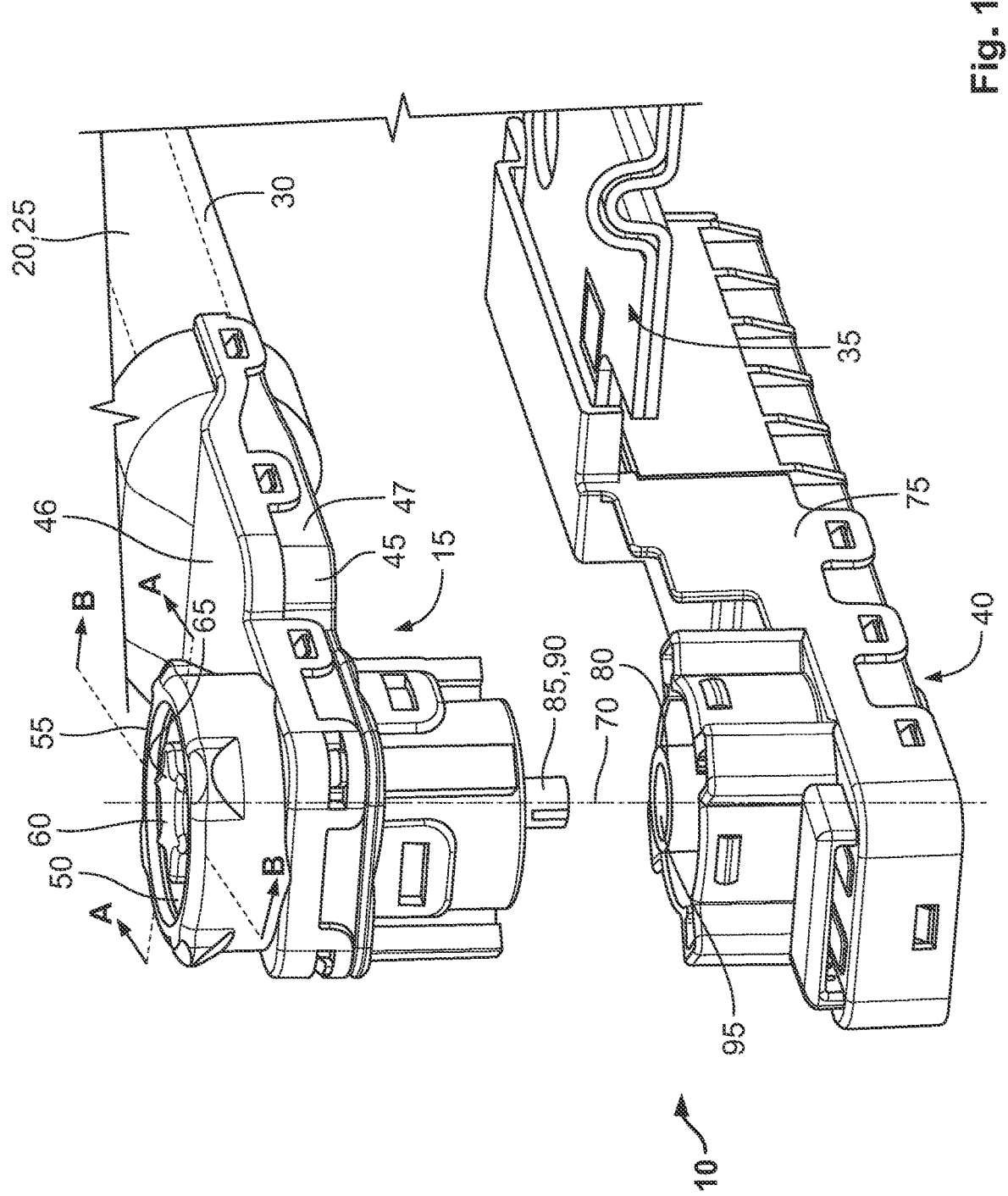
FIG. 1 is a perspective view of a contact system according to an embodiment.

FIG. 1 shows a perspective representation of a contact system 10 according to an embodiment. The contact system 10 has a contact device 15. The contact device 15 is electrically connected in FIG. 1 by way of example to an electric cable 20. The electric cable 20 is in the form of a high-current cable and serves to transmit an electric current of between 50 A and 500 A, for example for driving power components in a motor vehicle. The power component can be, for example, a starter motor or an electric drive motor of the motor vehicle. For this purpose, the electric cable 20 has an electrical conductor 25 which is indicated by a broken line in FIG. 1, wherein the electrical conductor 25, in an embodiment, has a cross-sectional area of from greater than 25 mm$^2$ to 500 mm$^2$, or between 50 mm$^2$ and 100 mm$^2$. The electrical conductor 25 is electrically insulated with respect to other components of the motor vehicle, for example electrically with respect to a terminal bus 35, by a sheath 30.

The electrical conductor 25, in an embodiment, is of fine- or very fine-wired form, so that the electric cable 20 can be installed in a bendable manner in the motor vehicle. The electrical conductor 25 can also be in the form of a single wire. The electrical conductor 25 has an electrically conducting material, for example copper and/or aluminum. The sheath 30 has an electrically non-conducting material. The sheath 30 sheathes the electrical conductor 25 completely on the circumferential side.

The contact system 10 further has a further contact device 40, as shown in FIG. 1, wherein the further contact device 40 is connected, for example, to the terminal bus 35. The further contact device 40 can also be connected to a further electric cable.

In FIG. 1, the contact device 15 and the further contact device 40 are shown in the disassembled state. The contact device 15 has a housing 45, wherein the electric cable 20 is guided in the housing 45, so that electrical contact to the outside of the electrical conductor 25 is prevented. The housing 45 has a first housing part 46 and a second housing part 47.

The housing parts 46, 47 together delimit a housing interior 50. The first housing part 46 of the housing 45 has a first housing opening 55, which in FIG. 1 is arranged at the top on a side remote from the further contact device 40. The housing interior 50 is accessible from the top in FIG. 1 via the first housing opening 55. A screw 60 is arranged in the housing interior 50. A screw head 65 of the screw 60 is arranged on a side facing the first housing opening 55. The screw 60 is rotatable in the housing 45 about a screw axis 70.

The further contact device 40 has a further housing 75, wherein a threaded bush 80 is arranged in the further housing 75. The threaded bush 80 is oriented in alignment with the screw axis 70 in FIG. 1. A shaft 85 of the screw 60, on which an external thread 90 is arranged at least in some portions, can be screwed into the threaded bush 80. Screwing in takes place in a first direction of rotation. Loosening of the screw 60 from the threaded bush 80 takes place by rotation of the screw 60 in the threaded bush 80 in a second direction of rotation contrary to the first direction of rotation.

The threaded bush 80 has an internal thread 95 which is configured so that it is at least complementary, and in an embodiment corresponds, to the external thread 90. Both the external thread 90 and the internal thread 95 extend around the screw axis 70.

In the description of FIGS. 1 to 23, reference is made to a cylindrical coordinate system based on the screw axis 70. An axial direction is thereby understood as meaning a direction parallel to the screw axis 70, a direction in the circumferential direction is understood as meaning a direction on a circular path around the screw axis 70, and a radial direction is understood as meaning a direction towards the screw axis 70 or away from the screw axis 70 in a plane perpendicular to the screw axis 70.

Figure 2:
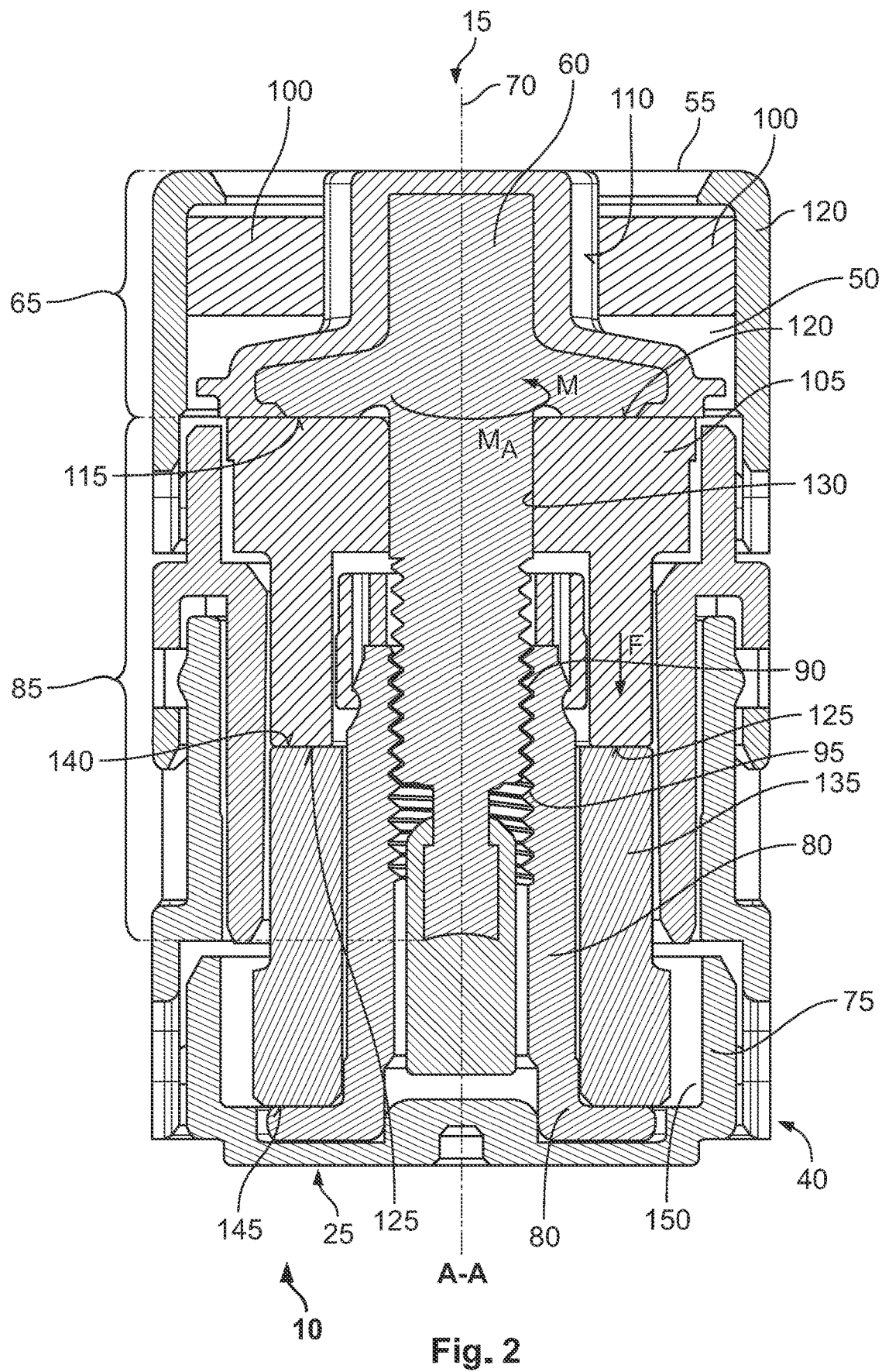
FIG. 2 is a sectional side view of the contact system of FIG. 1, taken along plane A-A.

In FIG. 2, the contact system 10 shown in FIG. 1 is shown in its general embodiment in the assembled state. The contact device 15 has, in addition to the housing 45 and the screw 60, a screw locking device 100 and a first contact element 105. The screw locking device 100 is indicated schematically in its general form in FIG. 2. The screw locking device 100 is arranged at least in part in the housing interior 50.

The screw head 65 is configured so as to be wider in the radial direction, based on the screw axis 70, than the shaft 85 connected to the screw head 65, as shown in FIG. 2. The screw head 65 adjoins the first housing opening 55 in the axial direction. The screw head 65 has a predefined screw head profile 110. The screw head profile 110 can be standard and can be in the form of, for example, an external torx profile or, for example, in the form of a hexagon head profile. A different form of the screw head profile 110 would also be conceivable. The screw head profile 110 serves for the attachment of a screw head drive and for initiating a torque M about the screw axis 70 for driving the screw 60.

On a side facing the shaft 85, the screw head 65 has a clamping surface 115, as shown in FIG. 2. The clamping surface 115 extends in a plane perpendicular to the screw axis 70.

The shaft 85, in an embodiment, is formed in one piece and of a single material with the screw head 65. The external thread 90 is arranged in some portions on the shaft 85.

As shown in FIG. 2, the first contact element 105 is in sleeve-like form and has a first end face 120 and a second end face 145. The first end face 120 is in planar form, wherein the clamping surface 115 lies on the first end face 120. On an axial side remote from the screw head 65, the first contact element 105 has a first contact surface 125. The first contact surface 125 is configured so as to extend perpendicularly to the screw axis 70. The first contact surface 125 can be in planar form.

In the first contact element 105 there is formed a screw opening 130 shown in FIG. 2, wherein the screw opening 130 extends as a through-opening through the first contact element 105. The shaft 85 passes through the screw opening 130 completely in the axial direction. The shaft 85 thereby projects beyond the first contact surface 125, for example, when the clamping surface 115 is lying against the first end face 120. The first contact element 105 is generally in sleeve-like form and is configured so as to extend shorter in the axial direction than the shaft 85.

The further contact device 40 has, in addition to the further housing 75 and the threaded bush 80, a second contact element 135 shown in FIG. 2. The second contact element 135 is in sleeve-like form and is electrically connected to the terminal bus 35. The second contact element 135 has on an axial side facing the screw head 65 a second contact surface 140. At a second end face 145 remote from the screw head 65, the threaded bush 80 engages behind the second contact element 135 in some portions with a collar. Both the threaded bush 80 and the second contact element 135 are arranged in a further housing interior 150 of the further housing 75.

In the assembled state of the contact device 15 with the further contact device 40 shown in FIG. 2, the external thread 90 is screwed at least in part into the internal thread 95 of the threaded bush 80, wherein the screw head 65, via the first end face 120, presses the first contact element 105 at the first contact surface 125 against the second contact surface 140 with a predefined force F. The predefined force F acts in the axial direction. As a result, particularly good electrical contact between the first contact surface 125 and the second contact surface 140 is ensured. As a result, the contact system 10 is particularly suitable for transmitting a high electric current. On the rear side, the threaded bush 80 is supported by the collar, via the second end face 145, on the second contact element 135.

In order to prevent unintentional rotation of the screw 60 about the screw axis 70, the screw locking device 100 is arranged in the housing interior 50 as shown in FIG. 2. The screw locking device 100 couples the screw head 65 with the housing 45 by interlocking and/or force-based engagement, in order thus to prevent unintentional loosening of the screw 60 (that is to say unintentional rotation of the screw 60 in the second direction of rotation) and, associated therewith, unintentional detachment of the first contact element 105 from the further contact device 40. In particular, poor electrical contact between the first contact surface 125 and the second contact surface 140 is also avoided. As a result, local heating of the first and second contact elements 105, 135 on transmission of the high electric current is avoided. As a result, the risk of fire, in particular a vehicle fire, can be avoided. This configuration has the advantage that it is possible to dispense with the application of a liquid, for example chemical, screw locking agent to the shaft 85, in particular into thread turns of the thread 90. As a result, possible contamination of the first contact element is avoided.

The predefined force F is specified by a predefined tightening torque $M_A$ shown in FIG. 2 with which the screw 60 is tightened in the threaded sleeve 85.

The screw locking device 100 couples the screw head 65 with the housing 45 by force-based and/or frictional and/or interlocking engagement. As a result, unintentional loosening of the screw 60 is prevented. Furthermore, the housing 40 and the further housing 75 are in engagement in such a manner that the housing 40 and the further housing 75 are connected together in a rotationally fixed manner about the screw axis 70.

Figure 3:
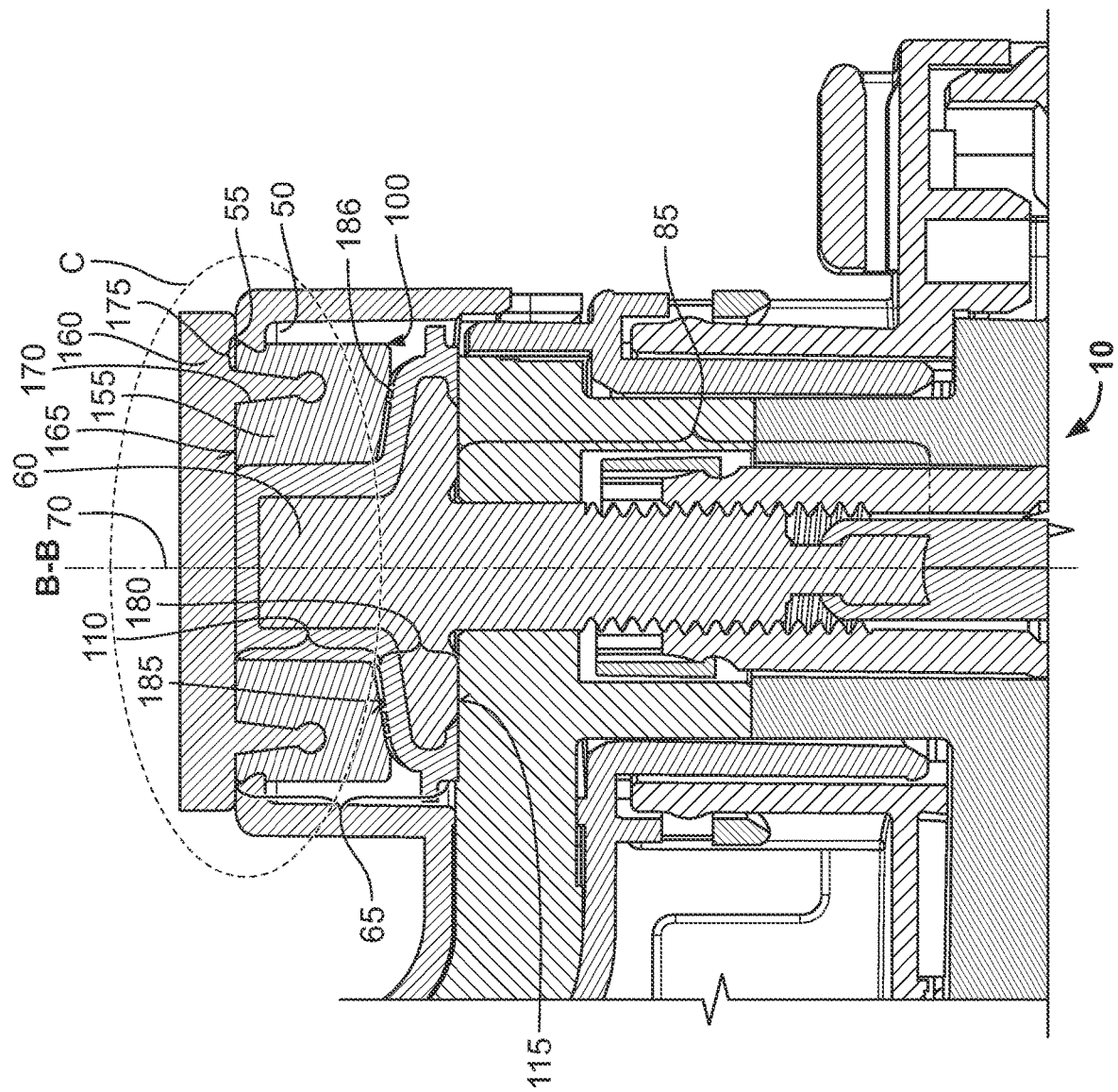
FIG. 3 is a detail sectional side view of the contact system of FIG. 1, taken along plane B-B.

The explanation given in FIGS. 1 and 2 applies to the contact system 10 according to the first embodiment explained in FIG. 3.

The screw locking device 100 is in two-part form as shown in FIG. 3. The screw locking device 100 has a holding element 155 and a closure element 160. The holding element 155 is configured so as to extend annularly around the screw axis 70. The holding element 155 is arranged, for example, in the housing interior 50 axially adjoining the first housing opening 55. The holding element 155 has on a third end face 165 remote from the screw 60 a groove 170 which is configured so as to extend around the screw axis 70. Radially outside the groove 170, the holding element 155 has a catch spring 175.

As shown in FIG. 3, the screw head 65 has, in addition to the screw head profile 110, a widening portion 180. The widening portion 180 is configured so as to be wider in the radial direction than the screw head profile 110 and projects beyond the screw head profile 110 in the radial direction. On the widening portion 180, at the end face on a side remote from the screw head profile 110, there is arranged the first clamping surface 115. On an axial side remote from the shaft 85, and accordingly on an axial side facing the screw head profile 110, the widening portion 180 has a first bearing surface 185. The first bearing surface 185 is oriented conically, based on the screw axis 70. It would also be conceivable for the first bearing surface 185 to be formed in a plane perpendicular to the screw axis 70. At least one compression rib 186 can be arranged on the first bearing surface 185.

Figure 4:
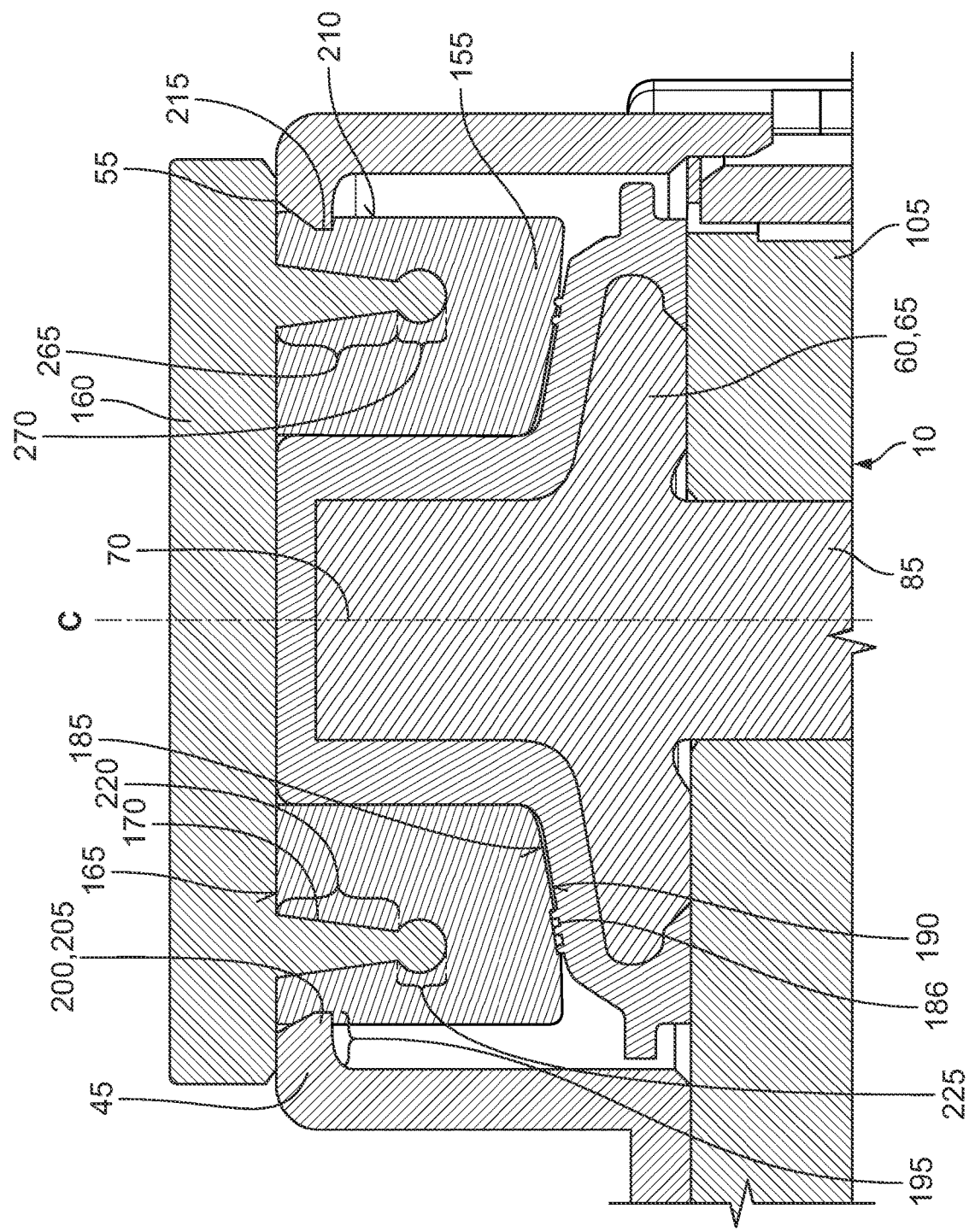
FIG. 4 is a detail view of a portion C of FIG. 3.

As shown in FIG. 4, on a side remote from the third end face 165, and accordingly on an axial side facing the shaft 85, the holding element 155 has a second bearing surface 190, wherein the second bearing surface 190 is configured at least in some portions corresponding to the first bearing surface 185. The first bearing surface 185 and the second bearing surface 190 lie against one another. The compression rib 186 can thereby be compressed by the second bearing surface 190.

At the first housing opening 55, the housing 45 has a collar 195 shown in FIG. 4. The collar 195 is formed radially inwards in the direction of the screw axis 70 and delimits radially on the inside, with a free end 200, the first housing opening 55. The collar 195 can be configured so as to extend in a plane perpendicular to the screw axis 70. A catch projection 205 can be formed radially inwards on the collar 195. The catch projection 205 reduces the first housing opening 55 in the radial direction as the distance from the shaft 85 decreases.

On an outer circumferential side 210, the holding element 155 has a catch receiver 215, wherein the catch receiver 215 is configured so that it corresponds to the form of the catch projection 205 as shown in FIG. 4. The catch receiver 215 adjoins the third end face 165 of the holding element 155 substantially at the end face. In the axial direction, the catch receiver 215 is configured so as to overlap the groove 170. An axial overlap is thereby understood as meaning that, when at least two components are projected in the radial direction into a projection plane in which the screw axis 70 extends, the two components, for example the catch projection 205, the catch receiver 215 and the groove 170, overlap in the projection plane.

The groove 170 is configured so as to be wider in the axial direction than the catch receiver 215, as shown in FIG. 4. The groove 170 thereby adjoins the third end face 165 in the axial direction and has a first groove portion 220 and a second groove portion 225 which is connected to the first groove portion 220.

As shown in FIG. 4, the first groove portion 220 is approximately V-shaped and tapers from the third end face 165 towards the second bearing surface 190. The second groove portion 225 is connected to the first groove portion 220 and has substantially a circular form in cross-section. The second groove portion 225 forms a groove base of the groove 170. The groove 170 ends spaced apart in the axial direction from the second bearing surface 190.

Figure 5:
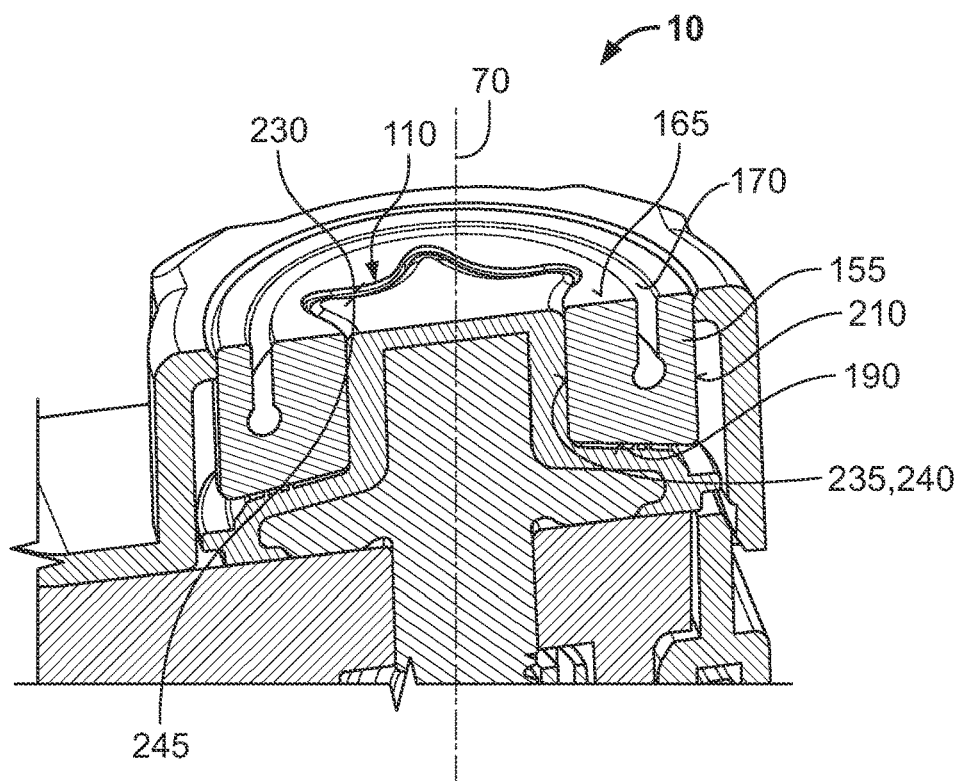
FIG. 5 is a sectional perspective view of the detail C of FIG. 4 without a closure element.

The groove 170 is configured to extend around the screw axis 70, as shown in FIG. 5. The groove 170 can also be partially interrupted in the circumferential direction. The groove 170 extends, for example, at a constant distance around the screw axis 70. The distance of the groove 170 from the screw axis 70 could also be varied.

The outer circumferential side 210 is configured so as to extend substantially on a circular path around the screw axis 70. In FIG. 5, it can clearly be seen that the screw head profile 110 is in the form of, for example, an external torx profile. The screw head profile 110 has, for example, at least a third bearing surface 230, wherein the third bearing surface 230 is configured to introduce the torque M into the screw head profile 110. The third bearing surface 230 is thereby oriented in a sloping manner relative to a circular path around the screw axis 70. The third bearing surface 230 extends substantially in a direction along the screw axis 70.

A receiver 240 of the holding element 155 shown in FIG. 5 is configured so that it is at least complementary, and in an embodiment corresponds, to the screw head profile 110. If, for example, as shown in FIG. 5, the screw head profile 110 has an external torx profile, then the receiver 240 is in the form of an internal torx profile. The receiver 240 extends in the axial direction between the second bearing surface 190 and the third end face 165. The receiver 240 is passed through in the axial direction substantially completely by the screw head profile 110. The receiver 240 lies at least with a fourth bearing surface 245 flat against the third bearing surface 230, so that the holding element 155 is connected in a rotationally fixed manner to the screw head profile 110.

Figure 6:
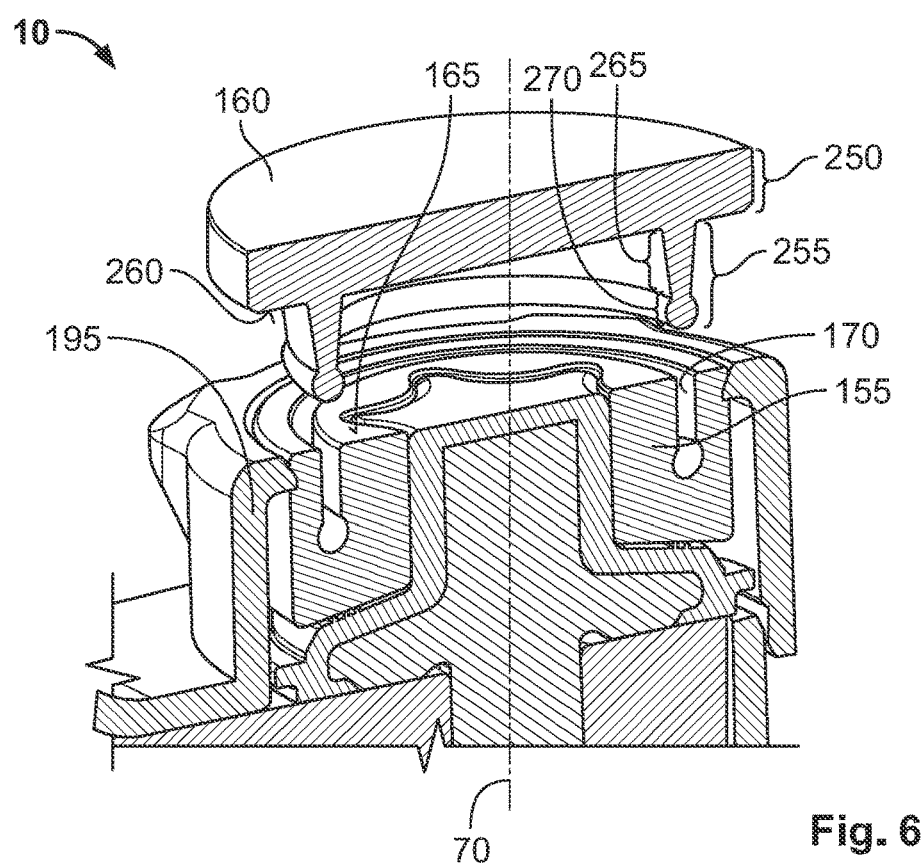
FIG. 6 is a sectional exploded perspective view of the detail C of FIG. 4.

The closure element 160 has a plate portion 250 and an engagement element 255, as shown in FIG. 6. The plate portion 250 is in plate-like form and extends in a plane perpendicular to the screw axis 70. The engagement element 255 and the plate portion 250 are, in an embodiment, produced in one piece and from a single material, for example from a plastics material, for example a thermoplastic, for example by an injection molding method. By way of example, the plate portion 250 is circular. With a fourth end face 260, the plate portion 250 lies radially on the outside on the collar 195 in the assembled state. Furthermore, the fourth end face 260 lies radially on the inside on the third end face 165 of the holding element 155 in the assembled state.

The engagement element 255 can be configured so that it is complementary, and in an embodiment corresponds, to the groove 170, as shown in FIG. 6. The engagement element 255 has, for example, a first engagement portion 265 and a second engagement portion 270, wherein the second engagement portion 270 is arranged on an axial side of the first engagement portion 265 that is remote from the fourth end face 260. The first engagement portion 265 is connected at the fourth end face 260 to the plate portion 250.

The first engagement portion 265 tapers from the fourth end face 260 as the axial distance from the fourth end face 260 increases. The second engagement portion 270 has a spherical form in cross-section. In the assembled state (see FIG. 4), the first engagement portion 265 engages into the first groove portion 220. The second engagement portion 270 engages into the second groove portion 225. The second engagement portion 270 is in the form of, for example, a thickened portion compared to the end of the first engagement portion 265 that is axially remote from the fourth end face 260 and in the assembled state (see FIG. 4) prevents the engagement element 255 from slipping out on engagement into the groove 170. The second engagement portion 270 and the second groove portion 225 thus serve as a loss prevention device or as an interlocking connection of the holding element 155 to the closure element 160.

The first engagement portion 265 fills the first groove portion 220 substantially completely and thereby prevents the catch spring 175 from being able to be pressed radially inwards. As a result, the engagement of the catch projection 205 into the catch receiver 215 is secured.

By the simultaneous bearing of the first bearing surface 185 on the second bearing surface 190, rotation of the screw 60 about the screw axis 70 for loosening the screw 60 can be prevented, since the screw head 65 would thereby move away from the first contact element 105 in the axial direction and would push the holding element 155 upwards in the axial direction. This movement of the holding element 155 is blocked by the engagement of the catch spring 15 into the catch receiver 215. As a result, an interlocking screw locking device is provided by the screw locking device 100.

In addition, in FIGS. 1 to 6 the screw locking device 100 acts as a frictional connection by the bearing of the first and second bearing surface 185, 190 and of the third and fourth bearing surface 230, 245 and the engagement of the catch projection 205 into the catch receiver 215, when the engagement element 255 presses the catch spring 175 radially outwards to such an extent that the catch projection 205 is pressed against the catch receiver 215 and thereby forms a frictional engagement.

As a result of the interlocking and optionally frictional connection of the screw head 65 to the housing 45, unintentional loosening of the screw 60 from the threaded bush 80 is effectively prevented. As a result, reliable long-term contact between the first contact element 105 at the first contact surface 125 and the second contact element 135 at the second contact surface 140 is ensured. This prevents overheating or heating of the contact system 10 at the contact surfaces 125, 140.

The configuration shown in FIGS. 1 to 6 provides stable contact such that the electrical contact between the two contact surfaces 125, 140 is reliably maintained over the entire lifetime of the contact system 10.

A contact system 10 according to another embodiment is shown in FIG. 7. The contact system 10 is configured substantially identically to the first embodiment shown in FIGS. 1 to 6. Only the differences in the second embodiment of the contact system 10 shown in FIG. 7 compared to the configuration of the contact system 10 shown in FIGS. 1 to 6 will be discussed hereinbelow.

The closure element 160 is cup-shaped in form in the embodiment shown in FIG. 7. The closure element 160 lies with an axial portion 275, which extends parallel to the screw axis 70, against an outer housing circumferential side 280 of the first housing part 46. The axial portion 275 is configured on the inside so that it corresponds to the outer housing circumferential side 280, so that the axial portion 275 is connected in a rotationally fixed manner to the first housing part 46 by interlocking engagement. Furthermore, the axial portion 275 can also be connected in the axial direction to the first housing part 46 by a catch, which is hidden in FIG. 7. The engagement element 255 is dispensed with in FIG. 7. Instead, the axial portion 275 is connected to the plate portion 250.

The holding element 155 is cup-shaped in form in the embodiment shown in FIG. 7 and attached to the screw head profile 110 at the top. The outer circumferential side 210 of the holding element 155 is arranged spaced apart from the free end 200 of the collar 195. The holding element 155 passes through the first housing opening 55.

Axially between the plate portion 250 and the screw head profile 110, the holding element 155 has a radial portion 285, wherein the radial portion 285 delimits the receiver 240 at the end face. On a side remote from the screw head profile 110, the radial portion 285 lies against the fourth end face 260. The screw head profile 110 can lie axially against the radial portion 285 in the receiver 240.

The screw locking device 100 additionally has a clamping element 290 in the embodiment of FIG. 7, wherein the clamping element 290 in the embodiment has, for example, a spiral spring portion 295 in the form of a spiral around the screw axis 70. The detailed configuration of the clamping element 290 will be discussed in FIG. 8. The spiral spring portion 295 is preloaded in the assembled state of the contact system 10.

As shown in FIG. 8, the clamping element 290 has, in addition to the spiral spring portion 295, a first holding portion 300 and a second holding portion 305, wherein the first holding portion 300 is U-shaped, for example, and engages into the axial portion 275 of the closure element 160. The second holding portion 305 extends radially inwards and is plate-shaped. The second holding portion 305 engages into the radial portion 285. The clamping element 290 is formed in one piece and of a single material. The spiral spring portion 295 can thereby have a plurality of turns 330 which are configured so as to extend in a spiral around the screw axis 70.

The spiral spring portion 295 is preloaded in an embodiment. The preloading force thereby generates a locking torque $M_G$ which acts about the screw axis 70 and acts against a loosening torque $M_L$ (see FIG. 7) for loosening the screw 60. The locking torque $M_G$ acts via the closure element 160 on the first housing part 46. As a result, unintentional loosening of the screw 60 and thus loosening of the contact at the contact surfaces 125, 140 is prevented.

Figure 9:
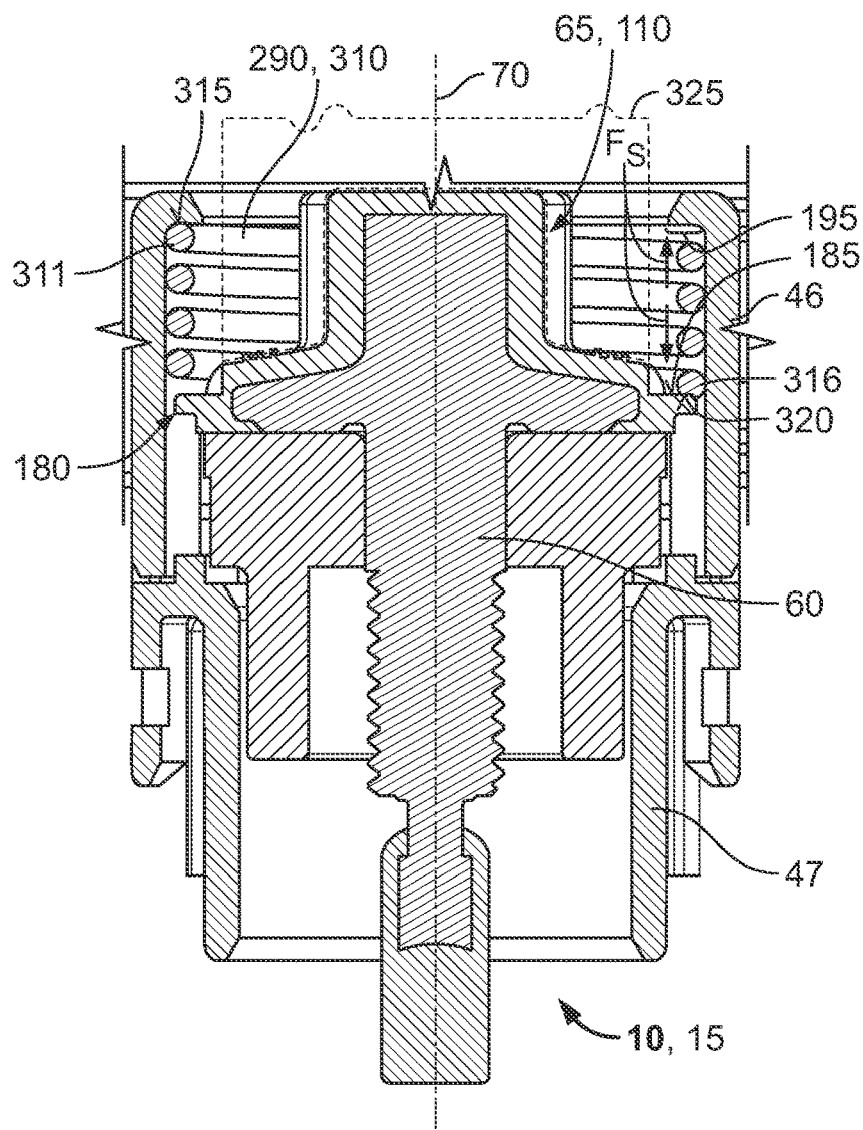
FIG. 9 is a sectional side view of a contact system according to a third embodiment.

A contact system 10 according to a third embodiment, shown in FIG. 9, is configured substantially identically to the embodiment shown in FIGS. 7 and 8. Only the differences in the contact system 10 shown in FIG. 9 compared to the contact system 10 shown in FIGS. 7 and 8 will be discussed hereinbelow.

The clamping element 290 is in the form of a helical spring in the embodiment and has a helical spring portion 310 in the embodiment shown in FIG. 9. The helical spring portion 310 extends around the screw axis 70. At a first axial end 311 of the helical spring portion 310 the helical spring portion 310 has a first helical spring end face 315. The first helical spring end face 315 lies against the collar 195 on an axial side facing the housing interior 50.

The first bearing surface 185 of the screw head 65 is arranged in FIG. 9 radially outwards on the widening portion 180 and extends in a plane perpendicular to the screw axis 70. The first bearing surface 185 is annular and, compared to the arrangement of the first bearing surface 185 as shown in FIGS. 1 to 6, is positioned radially on the outside with respect thereto. The first bearing surface 185 is arranged axially opposite the collar 195.

At a second axial end 316 of the helical spring portion 310, the helical spring portion 310 has a second helical spring end face 320 shown in FIG. 9. The second helical spring end face 320 lies against the first bearing surface 185 of the screw head 65. The helical spring portion 310 is preloaded in the assembled state of the screw 60 in the threaded bush 80 and provides a clamping force $F_S$ acting in the axial direction, wherein the clamping force $F_S$ presses the first helical spring end face 315 against the collar 195 and the second helical spring end face 320 against the first bearing surface 185.

Radially on the outside, the helical spring portion 310 can lie against the first housing part 46 on the inside. As a result of the preloaded arrangement, loosening of the screw 60 from the threaded bush 80 is more difficult in that, in the case of unintentional loosening of the screw 60 of its own accord, the screw 60 would tension the clamping element 290 further. Furthermore, as a result of the clamping force $F_S$, a frictional engagement is formed between the first bearing surface 185 and the second helical spring end face 320 and also between the first helical spring end face 315 and the collar 195.

Loosening of the screw 60 of its own accord, and thus rotation of the screw 60 about the screw axis 70, is further prevented in that, on loosening of the screw 60, the helical spring portion 310 would additionally be tensioned in the circumferential direction as a result of the frictional engagement between the first bearing surface 185 and the second helical spring end face 320 of the helical spring portion 310. The helical spring portion 310 would thereby expand in the radial direction and meet the first housing part 46 radially on the outside.

In order to assemble the contact device 15 on the further contact device 40, the screw 60 can be screwed in, wherein the second helical spring end face 320 thereby slides on the first bearing surface 185 shown in FIG. 9. Optionally, on rotation of the screw 60 about the screw axis 70, the clamping element 290 is taken along in the rotational movement. A tool 325 (indicated schematically by a broken line) can thereby be applied to the screw head profile 110 in order to rotate the screw 60 about the screw axis 70.

Figure 10:
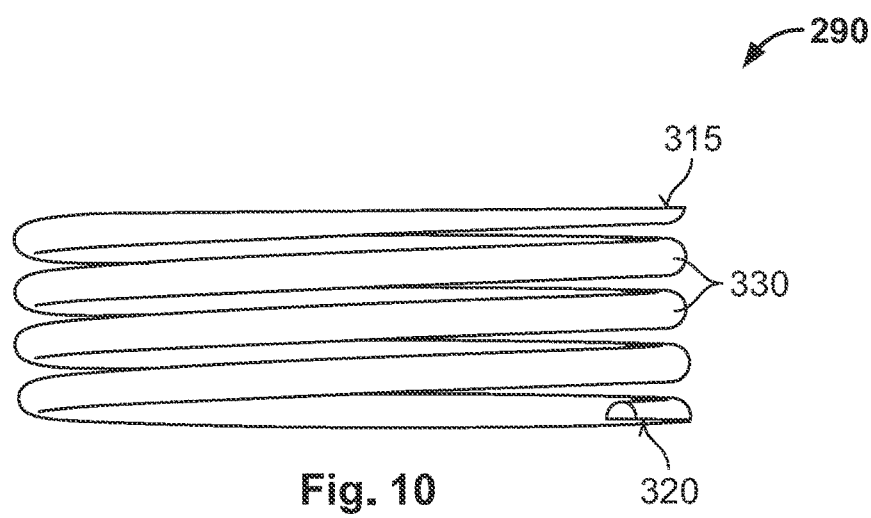
FIG. 10 is a perspective view of a clamping element of the contact system of FIG. 9.

The helical spring portion 310 can have a plurality of turns 330, shown in FIG. 10, which are arranged spaced apart relative to one another in the axial direction in the assembled state of the contact device 15 and the further contact device 40. At the first helical spring end face 315 and at the second helical spring end face 320, the helical spring portion 310, which is manufactured, for example, from a round material, can be flattened, in particular planar, so that the helical spring end face 315, 320 in each case lies flat against the collar 195 and/or against the first bearing surface 185.

Figure 11:
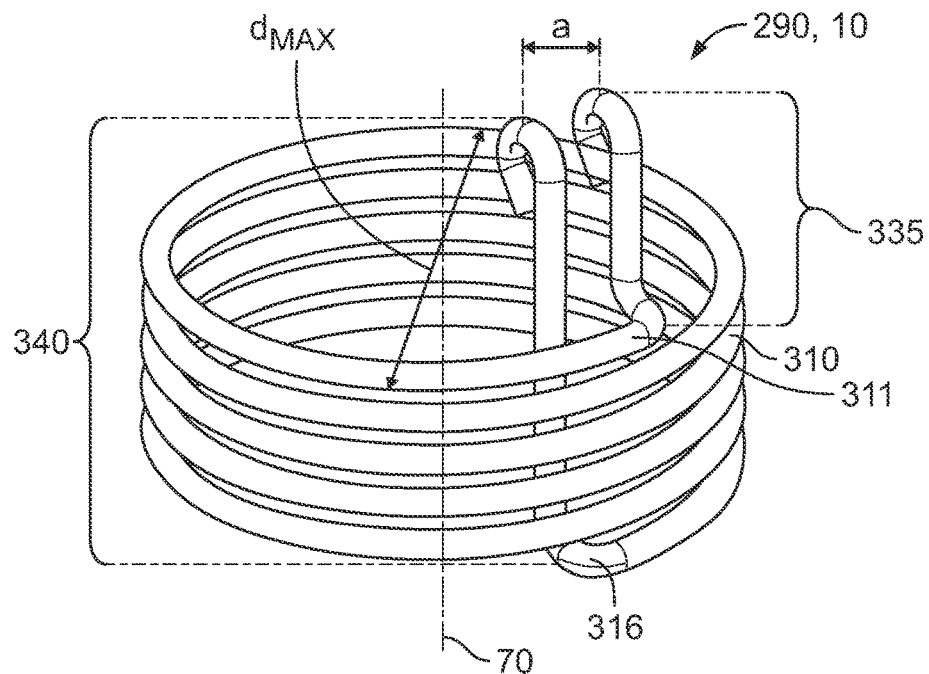
FIG. 11 is a perspective view of a clamping element of a contact system according to a fourth embodiment.

A clamping element 290 of a contact system 10 according to a fourth embodiment is shown in FIG. 11. The contact system 10 is configured substantially identically to the contact system 10 shown in FIGS. 1 to 10, in particular compared to the contact system 10 explained in FIGS. 9 and 10. Only the differences in the contact system 10 shown in FIG. 11 compared to the contact system 10 shown in FIGS. 9 and 10 will be discussed hereinbelow.

The clamping element 290 in the embodiment of FIG. 11 is configured substantially identically to the clamping element 290 shown in FIGS. 8 and 9. The clamping element 290 additionally has a first mounting portion 335 and a second mounting portion 340. The first mounting portion 335 and the second mounting portion 340 extend substantially in the axial direction. The first mounting portion 335 is thereby connected to the first axial end 311 and the second mounting portion 340 is connected to the second axial end 316. The first mounting portion 335 is connected to the first axial end 311 and the second mounting portion 340 is connected to the second axial end 316. The second mounting portion 340 and the first mounting portion 335 are oriented extending parallel to the screw axis 70, wherein the second mounting portion 340 is formed on the inside of the helical spring portion 310. In addition, the mounting portion 335, 340, which is formed in one piece and of a single material with the helical spring portion 310 in an embodiment, can have an eye on the axial side facing the first or second axial end 311, 316, respectively, which eye serves to receive pliers, for example needle-nose pliers.

If a distance a between the first mounting portion 335 and the second mounting portion 340 is reduced, for example by pressing the two mounting portions 335, 340 together at the eye by the needle-nose pliers, the helical spring portion 310 is tensioned. Furthermore, a maximum outside diameter $d_{MAX}$ of the helical spring portion 310 shown in FIG. 11 is thereby reduced. If the distance a between the first mounting portion 335 and the second mounting portion 340 is increased, then the maximum outside diameter $d_{MAX}$ is also increased.

Figure 12:
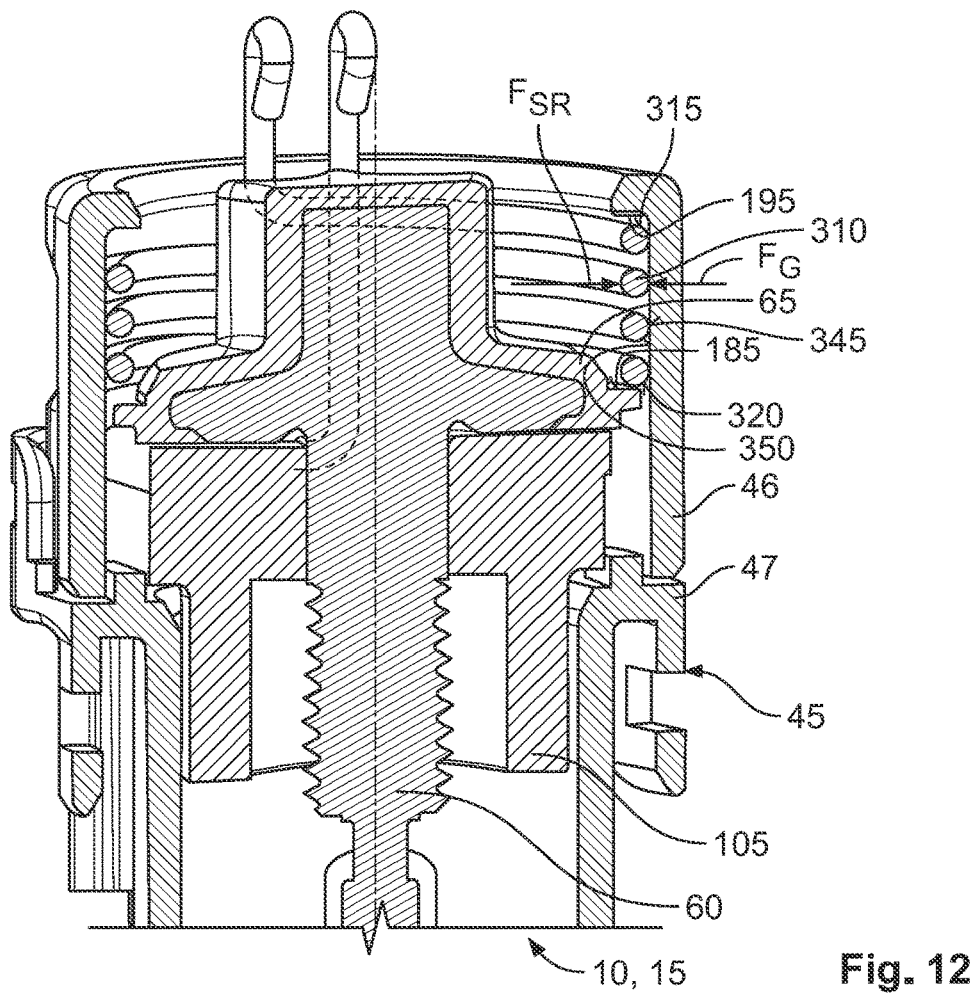
FIG. 12 is a sectional side view of the contact system of FIG. 11.

As shown in the embodiment of FIG. 12, the clamping element 290, as also in FIGS. 9 and 10, is arranged in the axial direction between the first bearing surface 185 of the screw head 65 and the collar 195. The first helical spring end face 315 thereby lies against the collar 195. The second helical spring end face 320 lies in FIG. 12, for example, on the underside against the first bearing surface 185.

In the assembled state shown in FIG. 12, the helical spring portion 310, for example, provides a further clamping force $F_{SR}$, which acts radially outwards. The helical spring portion 310 thereby lies with an outer helical spring circumferential side 345 against an inner housing circumferential side 350 of the first housing part 46. The further clamping force $F_{SR}$ thereby presses the outer helical spring circumferential side 345 against the inner housing circumferential side 350 of the first housing part 46, wherein the first housing part 46 provides a counter-force $F_G$ to the further clamping force $F_{SR}$. The counter-force $F_G$ and the further clamping force $F_{SR}$ ensure that the outer helical spring circumferential side 345 and the inner housing circumferential side 350 form a frictional engagement. The frictional engagement has the effect that the helical spring portion 310 is axially fixedly connected to the first housing part 46 of the housing 45 in the axial direction.

On the underside, the second helical spring end face 320 lies on the first contact surface 185, as shown in FIG. 12. Loosening of the screw 60 of its own accord, and thus rotation of the screw 60 relative to the threaded bush 85, is prevented in that the clamping element 290 would additionally be axially tensioned on loosening. As a result, reliable electrical contacting between the two contact elements 105, 135 is ensured.

Assembly of the contact device 15 on the further contact device 40 can take place in that the screw 60 is screwed into the threaded bush 80 and the first contact element 105 is thereby pressed onto the second contact element 135. The two mounting portions 335, 340 are then pulled together, for example by pliers, so that the distance a is reduced. The two mounting portions 335, 340 can thereby also touch one another. As a result, the clamping element 290 can be introduced into the housing interior 50 through the first housing opening 55.

The clamping element 290 is thereby pushed downwards in the axial direction towards the screw head 65 to such an extent that the second helical spring end face 320 comes to lie on the first bearing surface 185. The mounting portions 335, 340 are then released, and the helical spring portion 310 presses against the inner housing circumferential side 350 with the further clamping force $F_{SR}$ and forms the frictional engagement. The first helical spring end face 310 further presses against the collar 195 and provides the clamping force $F_S$. As a result, the contact system 10 in the embodiment shown in FIGS. 11 and 12 can be assembled particularly quickly and easily. In particular, the contact system 10 can also be reversibly disassembled without being damaged.

Figure 13:
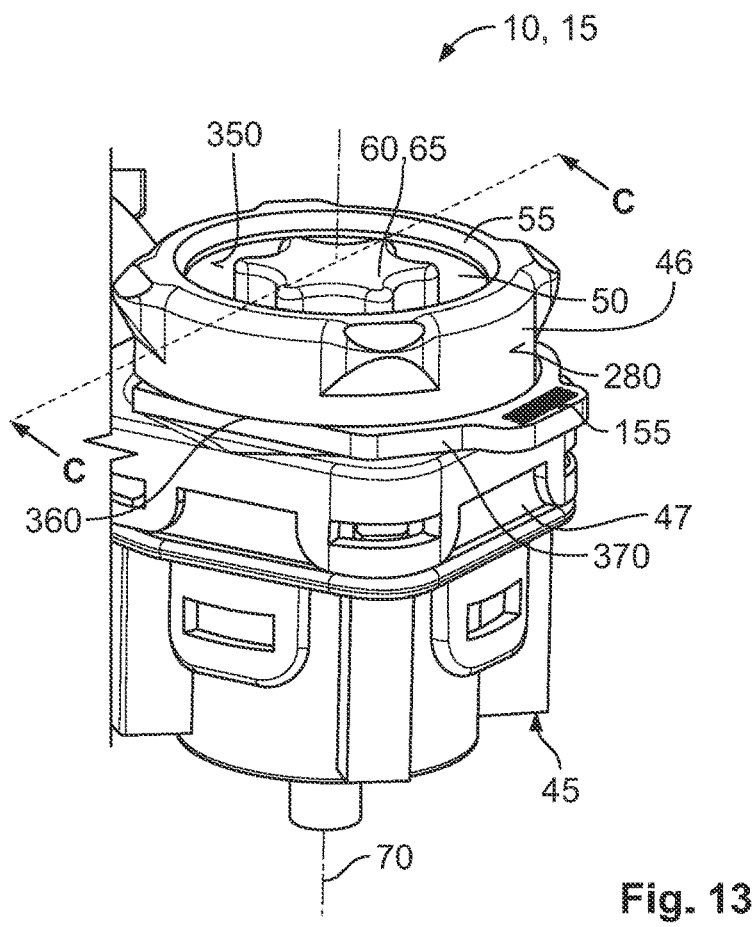
FIG. 13 is a perspective view of a contact device of a contact system according to a fifth embodiment.

A contact system 10 according to a fifth embodiment shown in FIG. 13 is configured substantially identically to the contact system 10 described in FIGS. 1 to 12. Only the differences in the contact system 10 shown in FIG. 13 compared to the contact system 10 shown in FIGS. 1 to 12 will be discussed hereinbelow.

In the embodiment shown in FIG. 13, the first housing part 46 has a second housing opening 360 on the outer housing circumferential side 280. The second housing opening 360 is in slot-like form and extends from the outer housing circumferential side 280 completely through the first housing part 46 to the inner housing circumferential side 350. The second housing opening 360 is, for example, configured so as to be significantly narrower in the axial direction than its extent in the circumferential direction, or tangential direction, based on the screw axis 70.

In the embodiment shown in FIG. 13, a pair of second housing openings 360 are arranged opposite one another in the radial direction on the first housing part 46 of the housing 45 (hidden in FIG. 13), which housing openings are configured so as to be spaced apart from one another in the circumferential direction. The second housing opening 360 is arranged offset in the axial direction, based on the screw axis 70, with respect to the first housing opening 55, which is arranged, based on the screw axis 70, on the end face, in FIG. 13 on the upper side. The first housing opening 55 can also be configured so as to be open in the finished assembled state of the contact system 10, so that the screw 60, in particular the screw head 65, is accessible, for example for the tool 325, from above. The second housing opening 360 opens on the inside in the housing interior 50.

Figure 14:
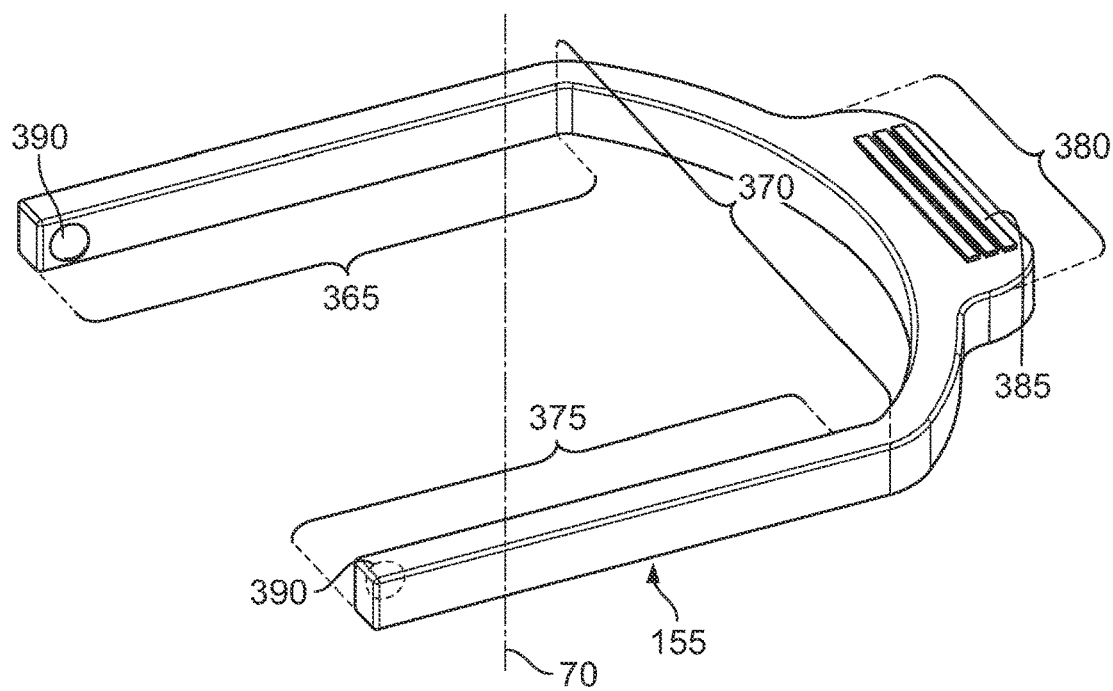
FIG. 14 is a perspective view of a holding element of the contact system of FIG. 13.

The holding element 155 of the contact system 10 shown in FIG. 13 is in shackle-shaped form. The holding element 155 is arranged in part outside the housing 45 on the outer housing circumferential side 280 and engages in part into the second housing opening 36. FIG. 14 shows a perspective representation of the holding element 155 shown in FIG. 13.

The holding element 155 has a first shackle portion 365, a second shackle portion 370 and a third shackle portion 375. The basic shape of the holding element 155 is shackle-shaped, in particular U-shaped, in FIG. 14. The first shackle portion 365 and the third shackle portion 375 are thereby arranged on a common side of the second shackle portion 370 and are each in the form of, for example, a linearly extending bar. The second shackle portion 370 connects the first shackle portion 365 to the third shackle portion 375, wherein a gripping portion 380 can be provided on the second shackle portion 370 on the rear side on a side remote from the first shackle portion 365 and the third shackle portion 375, in order to permit particularly easy positioning of the holding element 155. A gripping surface which has a fluting 385, for example, can thereby be arranged on the widening portion 380.

In addition, a further catch projection 390 can be arranged on the first shackle portion 365 on a side facing the third shackle portion 375 and/or on the third shackle portion 375 on a side facing the first shackle portion 365, wherein the further catch projection 390 is in the form of, for example, a hemispherical protuberance in FIG. 14. A different form of the further catch projection 390 would also be possible. The further catch projection 390 in the spherical configuration allows the further catch projection 390 to be passed over in the tangential direction, based on the screw axis 70.

Figure 15:
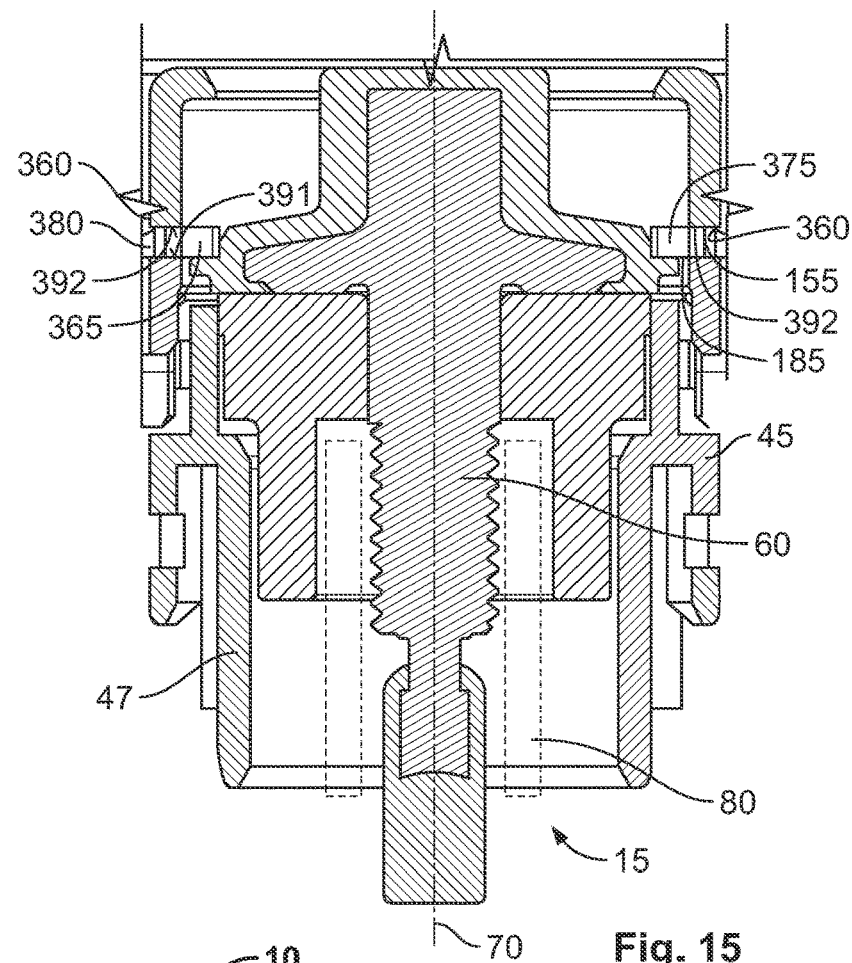
FIG. 15 is a sectional side view of the contact system of FIG. 13, taken along plane C-C.

FIG. 15 is a sectional view along a sectional plane C-C shown in FIG. 13 through the contact device 15 shown in FIG. 15. In FIG. 15, the screw 60 is shown in the finished screwed-in state in the threaded bush 80. Furthermore, the holding element 155 has been pushed laterally onto the housing 45. In the assembled state of the two contact devices 15, 40 with one another, the first bearing surface 185, which is configured as shown in FIGS. 7 to 12, is arranged axially at the same height relative to the second housing opening 360. It is a particular advantage here if a lower, first opening surface 391, arranged on a side facing the second housing part 47, of the second housing opening 360 is arranged in a common plane with the first bearing surface 185.

As shown in FIG. 15, in the mounted state of the holding element 155 on the housing 45, the first shackle portion 365 passes through the second housing opening 360 and the third shackle portion 375, which is located opposite the first shackle portion 365, passes in the radial direction through the second housing opening 360 arranged opposite. The first shackle portion 365 and the third shackle portion 375 extend tangentially to the screw axis 70. The first shackle portion 365 and the third shackle portion 375 thereby each lie on the underside on the first bearing surface 185. On the upper side, the first shackle portion 365 and the third shackle portion 375 are each supported on a second opening surface 392, which is arranged axially opposite the first opening surface 391. In an embodiment, the second housing opening 360 is configured so as to be substantially equally as wide in the axial direction as the first shackle portion 365 and/or the third shackle portion 375. The second shackle portion 370 is arranged outside the first housing part 46 (see FIG. 13).

Figure 16:
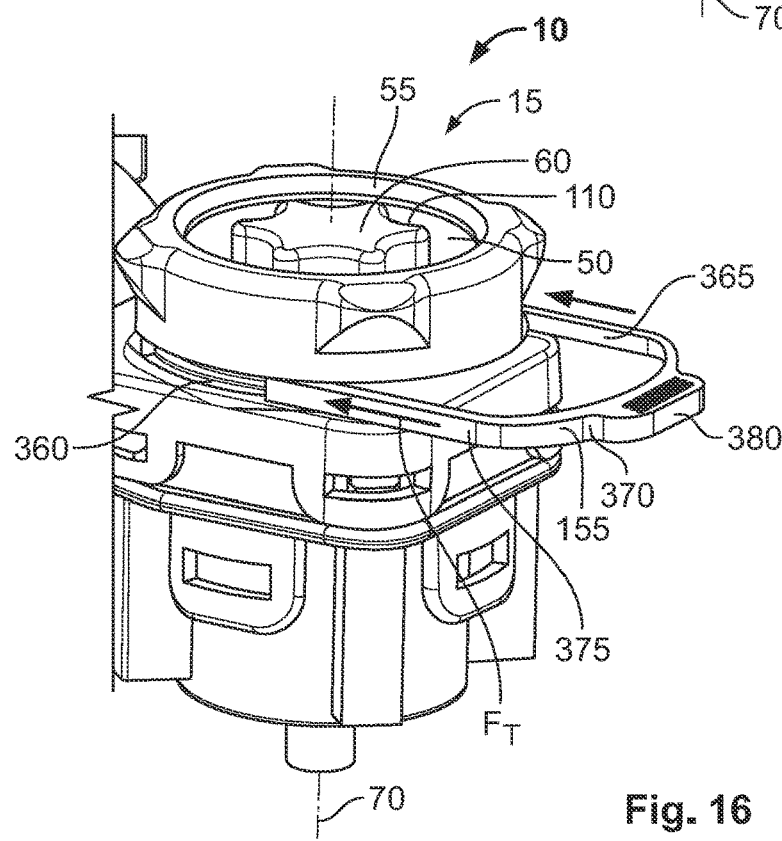
FIG. 16 is a perspective view of the contact system of FIG. 13.

FIG. 16 shows a perspective representation of the contact system 10 shown in FIGS. 13 to 15, wherein the further contact device 40 is not shown in FIG. 16. After the contact device 15 has been attached to the further contact device 40 in an assembly direction extending parallel to the screw axis 70, the screw 60 is rotated about the screw axis 70 in a first direction of rotation and screwed into the threaded bush 80. For this purpose, the tool 325, for example a torx key, in particular a torx nut, can be introduced into the housing interior 50 via the first housing opening 55 and fitted onto the screw head profile 110.

After the screw 60 has been screwed in, the holding element 155 is introduced laterally with the first shackle portion 365 and the third shackle portion 375 into the second housing opening 360, as shown in FIG. 16. A tangential force $F_T$, which acts tangentially to the screw axis 70, can thereby be introduced into the holding element 155 via the second shackle portion 370, in particular via the gripping portion 380. When the holding element 155 is pushed onto the screw head 65, the further catch projection 390 slides tangentially on the screw head 65 on the circumferential side and optionally widens the holding element 155 in the radial direction.

Figure 17:
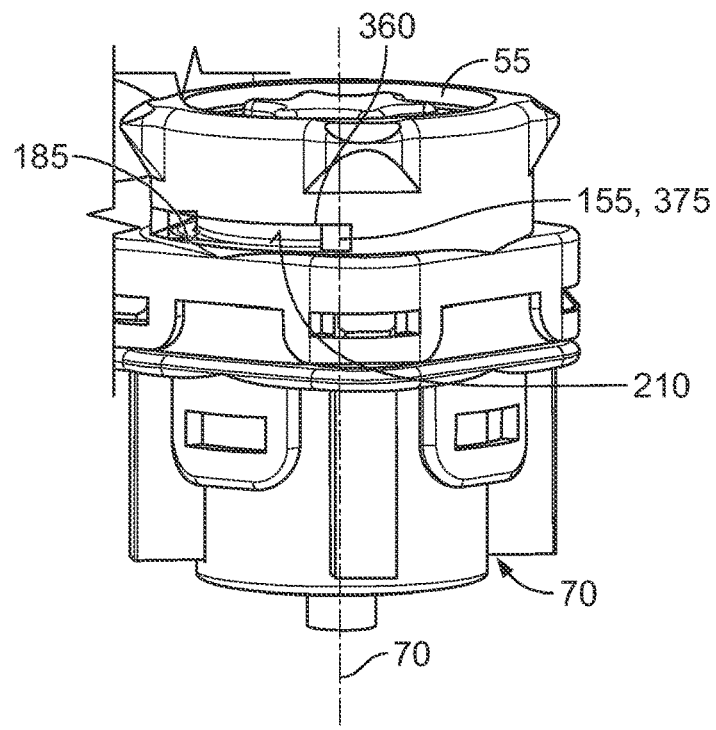
FIG. 17 is a perspective view of the contact system of FIG. 13.

FIG. 17 shows the contact system 10 shown in FIGS. 13 to 16, wherein the holding element 155 is shown only partially for reasons of clarity. After the screw head 65 has slid over the further catch projection 390, the holding element 155 can be pushed on so far that the second shackle portion 370 lies against the outer housing circumferential side 280, as shown in FIG. 13. The first shackle portion 365 and the third shackle portion 375 thereby each pass through the associated second housing opening 360 and block an axial movement space of the screw 60 towards the first housing opening 55, so that unintentional loosening of the screw 60 is prevented in a simple manner. Unintentional detachment of the holding element 155 is prevented by contact of the further catch projection 390 with the outer circumferential side 210 of the screw head 65.

Figure 18:
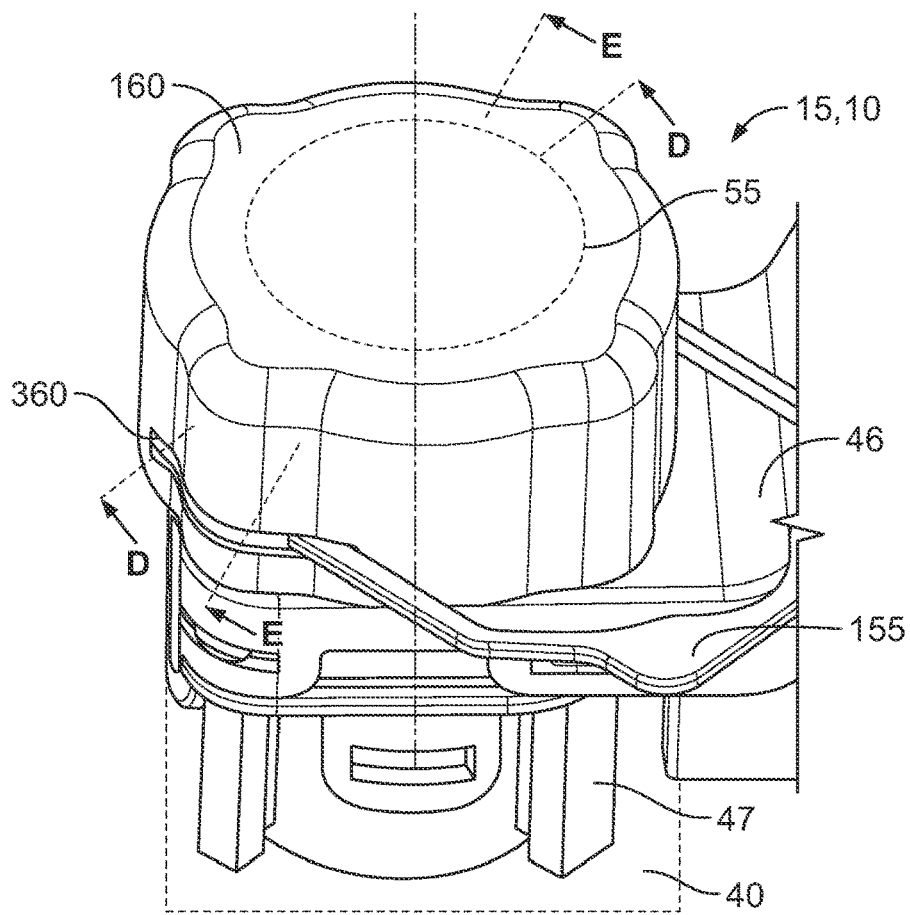
FIG. 18 is a perspective view of a contact system according to a sixth embodiment.

A contact system 10 according to a sixth embodiment shown in FIG. 18 is configured substantially identically to the contact systems 10 shown in the preceding figures. In particular, the contact system 10 shown in FIG. 18 is a combination of the embodiments shown in FIGS. 7 to 10, 13 to 17.

The closure element 160 shown in FIG. 18 is cup-like and on the circumferential side engages around the first housing part 46 in some portions adjoining the first housing opening 55. The second housing opening 360 is arranged in the closure element 160 instead of in the first housing part 46.

Figure 19:
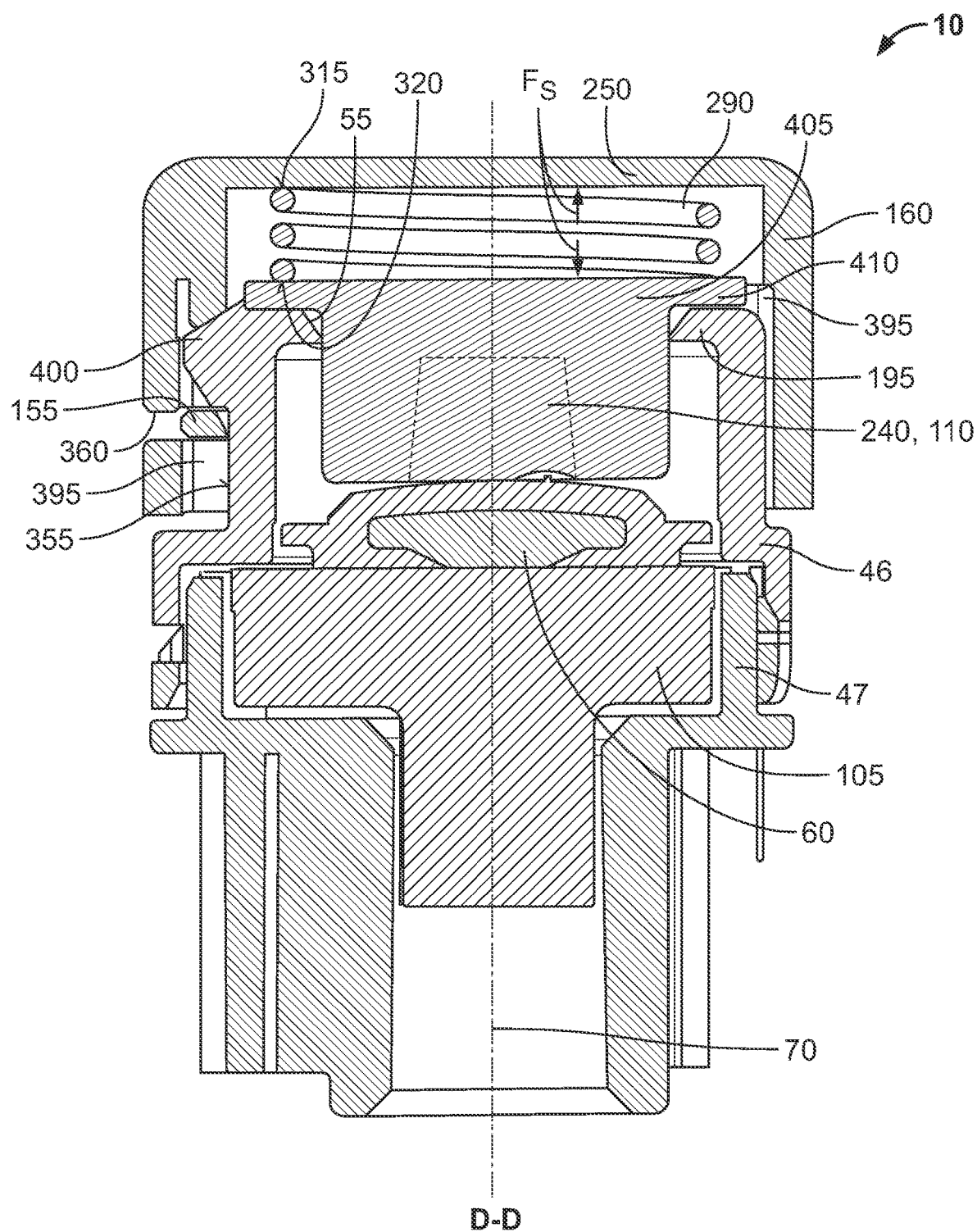
FIG. 19 is a sectional side view of the contact system of FIG. 18, taken along plane D-D.

FIG. 19 is a sectional view along a sectional plane D-D shown in FIG. 18 through the contact system 10 shown in FIG. 18. In FIG. 19, the further contact device 40 is not shown. The closure element 160, which is in the form of a cover, has on the inside at least one recess 395. In an embodiment, a plurality of recesses 395 arranged offset relative to one another in the circumferential direction are provided on the outer housing circumferential side. The first housing part 46 has on the outer housing circumferential side 280 at least one protrusion 400 which is nose-shaped. The protrusion 400 is configured so as to be shorter in the axial direction, based on the screw axis 70, than the recess 365. In the assembled state, the second housing opening 360 is arranged axially between the second housing part 47 and the protrusion 400. In the assembled state, the protrusion 400 engages into the recess 395, wherein the protrusion 400 and the recess 395 are configured so as to correspond to one another in the radial direction and in the circumferential direction. As a result, the closure element 160 is connected in a rotationally fixed manner to the first housing part 46.

In the assembled state, the holding element 155 passes through the second housing opening 360. The holding element 155 thereby engages behind the protrusion 400 in the axial direction on an axial side remote from the plate portion 250, as shown in FIG. 19.

The screw locking device 100 additionally has a further holding element 405 shown in FIG. 19, wherein the further holding element 405 is a further development of the holding element 155 shown in FIGS. 3 to 6. The further holding element 405 has the receiver 240. On the upper side, the further holding element 405 has an edge 410 which is configured so as to extend around the further holding element 405. The edge 410 lies on the collar 195 on a side remote from the first contact element 105. The further holding element 405 passes through the first housing opening 55 and receives the screw head profile 110 in the receiver 240.

Between the plate portion 250 and the further holding element 405 there is arranged the clamping element 290 shown in FIG. 19. The clamping element 290 is configured as shown in FIG. 10, wherein the first helical spring end face 315 lies against the plate portion 250 and the second helical spring end face 320 lies against the further holding element 405. The clamping element 290 is preloaded and provides the clamping force $F_S$, which acts in the axial direction. The clamping element 290 thereby clamps the closure element 160 via the holding element 155 and engagement in the second housing opening 360 against the first housing part 46. Furthermore, the clamping force $F_S$ acts via the further holding element 405 and the edge 410 thereof on the collar 195.

On the underside, the clamping element 290 is supported on the further holding element 405 and presses the further holding element 405 with the edge 410 onto the collar 195, as shown in FIG. 19. As a result, the further holding element 405 is connected by frictional engagement to the first housing part 46. At the same time, the screw head profile 110 engages into the receiver 240. As a result of the frictional engagement between the first housing part 46 and the further holding element 405, the screw 60 is prevented from loosening of its own accord. On the other hand, the clamping force $F_S$, which acts on the screw head 65 in the axial direction from above via the further holding element 405, prevents the screw head 65 from moving axially in the direction of the clamping element 290.

Figure 20:
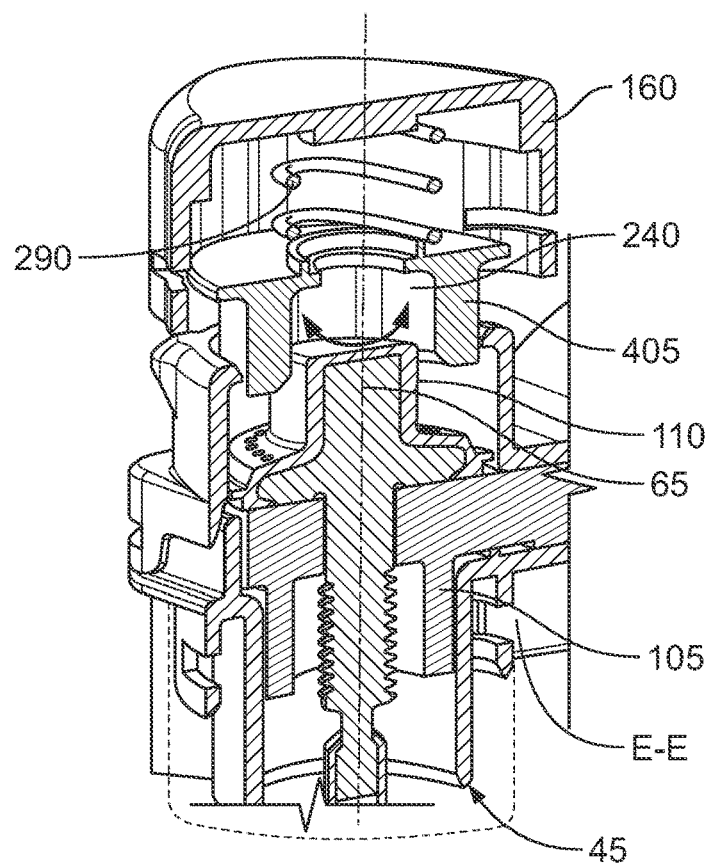
FIG. 20 is a sectional perspective view of the contact system of FIG. 18, taken along plane E-E.
Figure 21:
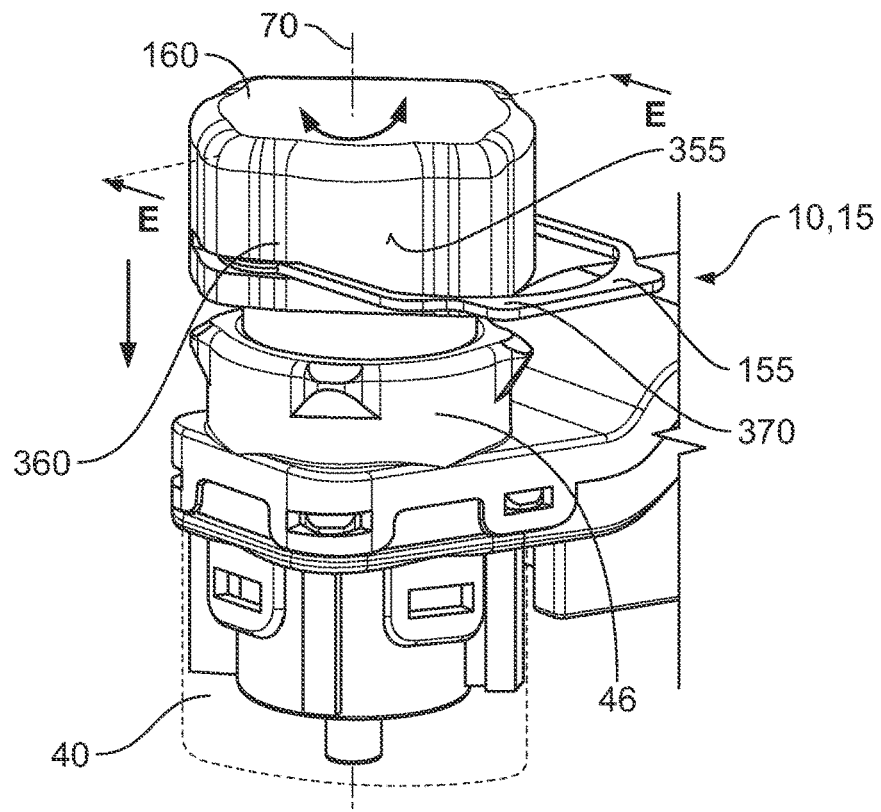
FIG. 21 is a perspective view of the contact system of FIG. 18 in a fourth step of assembly.
Figure 22:
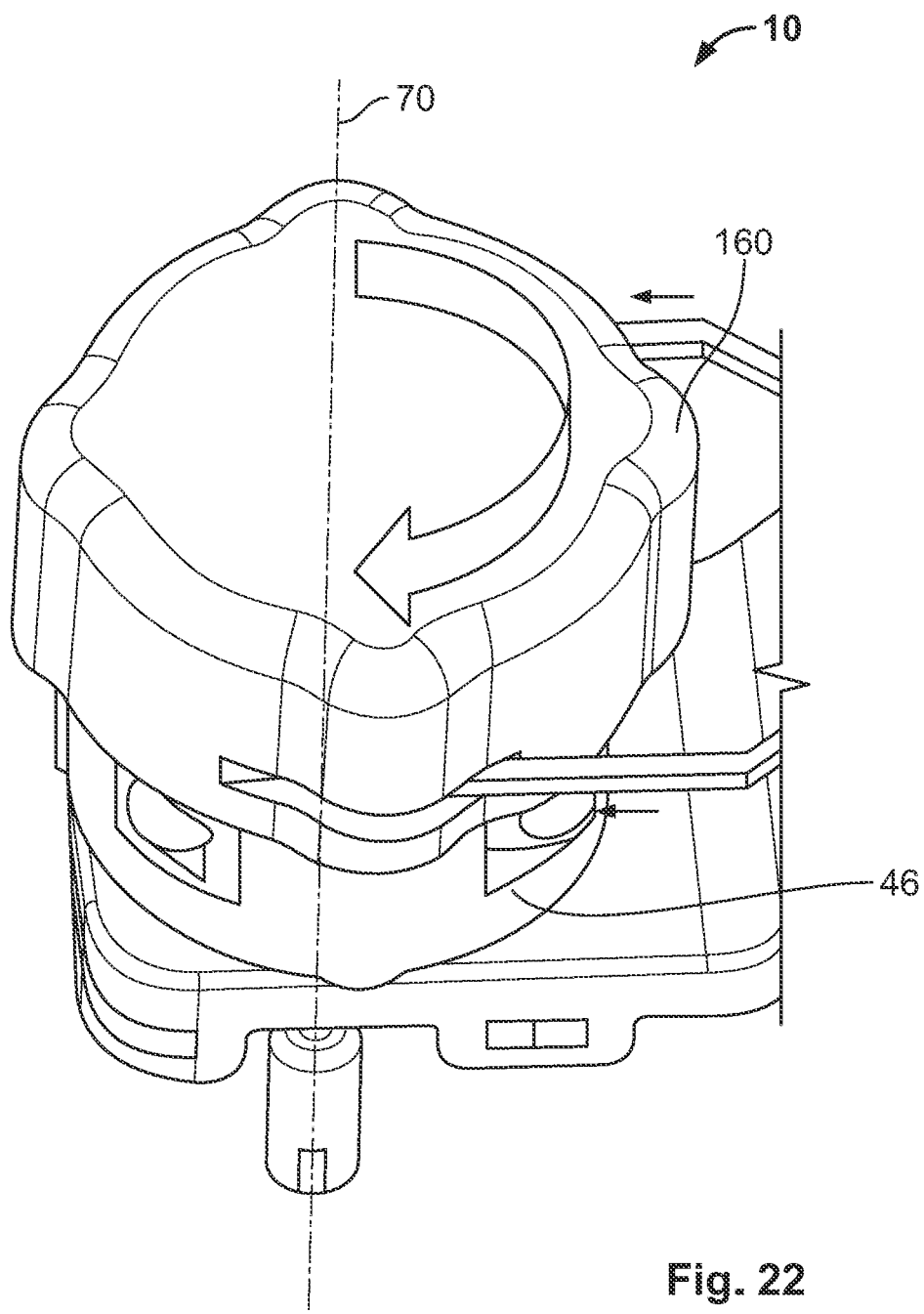
FIG. 22 is a perspective view of the contact system of FIG. 18 in a fourth step of assembly.
Figure 23:
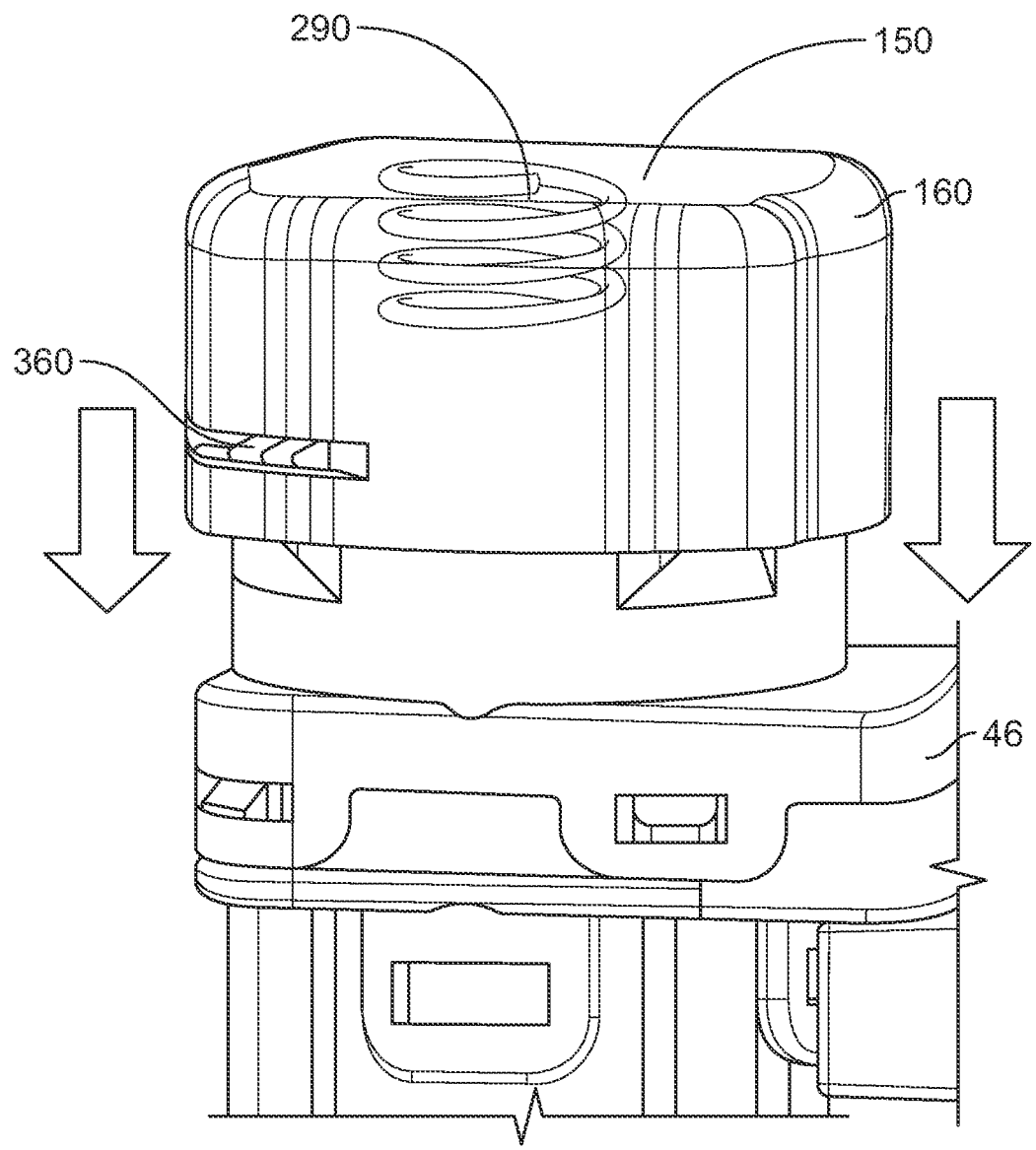
FIG. 23 is a perspective view of the contact system of FIG. 18 in a fifth step of assembly.

FIG. 20 is a sectional view along a sectional plane E-E shown in FIG. 18 through the contact system 10 shown in FIG. 18 during a third assembly step of the assembly of the contact system 10 shown in FIGS. 13 to 19. FIG. 21 and FIG. 22 show perspective representations of the contact device 15 in a fourth assembly step of an assembly of the contact system 10. FIG. 23 shows a perspective representation of the contact device 15 in a fifth assembly step of an assembly of the contact system 10.

In the assembly of the contact system 10, the holding element 155 is pushed only partially into the second housing opening 360, so that the second shackle portion 370 is arranged spaced apart from the outer housing circumferential side 280.

In a first assembly step, the housing 45 together with the first contact element 105 is assembled with and attached to the further contact device 40.

In a second assembly step, the screw 60 is screwed into the threaded bush 80 and tightened with the predefined tightening torque $M_A$. As a result, the first contact element 105 is pressed onto the second contact element 135 and good electrical contact is established between the first contact element 105 and the second contact element 135.

In a third assembly step, shown in FIG. 20, following the second assembly step, the further holding element 405 is attached to the screw head 65 until the edge 410 lies on the collar 195. In order to permit attachment, the further holding element 405 can be rotated about the screw axis 70 until the screw head profile 110 and the receiver 240 are oriented correspondingly to one another.

In the fourth assembly step, shown in FIGS. 21 and 22, the closure element 160 is rotated relative to the first housing part 46 in the circumferential direction about the screw axis 70 until the recess 395 and the protrusion 400 are arranged overlapping in the axial direction. An axial overlap is thereby understood as meaning that, when two components, for example the recess 395 and the protrusion 400, are projected in the axial direction into a projection plane which extends perpendicular to the screw axis 70, the two components, for example in FIG. 21 the recess 395 and the protrusion 400, overlap in the projection plane.

In a fifth assembly step, shown in FIG. 23, the closure element 160 is pushed in the direction of the first housing part 46 until the protrusion 400 is arranged axially between the plate portion 250 and the second housing opening 360. The clamping element 290 is thereby tensioned.

In a sixth assembly step, the holding element 155 is pushed on tangentially and the first shackle portion 365 and the third shackle portion 375 are guided through the respective associated second housing opening 360.

In a seventh assembly step following the sixth assembly step, the closure element 160 is released so that the clamping element 290 pushes the closure element 160 away from the first housing part 46 until the protrusion 400 lies against the holding element 155, in particular against the first shackle portion 365 or the third shackle portion 375, and a further axial movement of the closure element 160 relative to the first housing part 46 is thereby blocked.

As a result, the contact system 10 shown in FIGS. 13 to 23 can be assembled particularly easily and can also be disassembled reversibly without being damaged.

Figure 24:
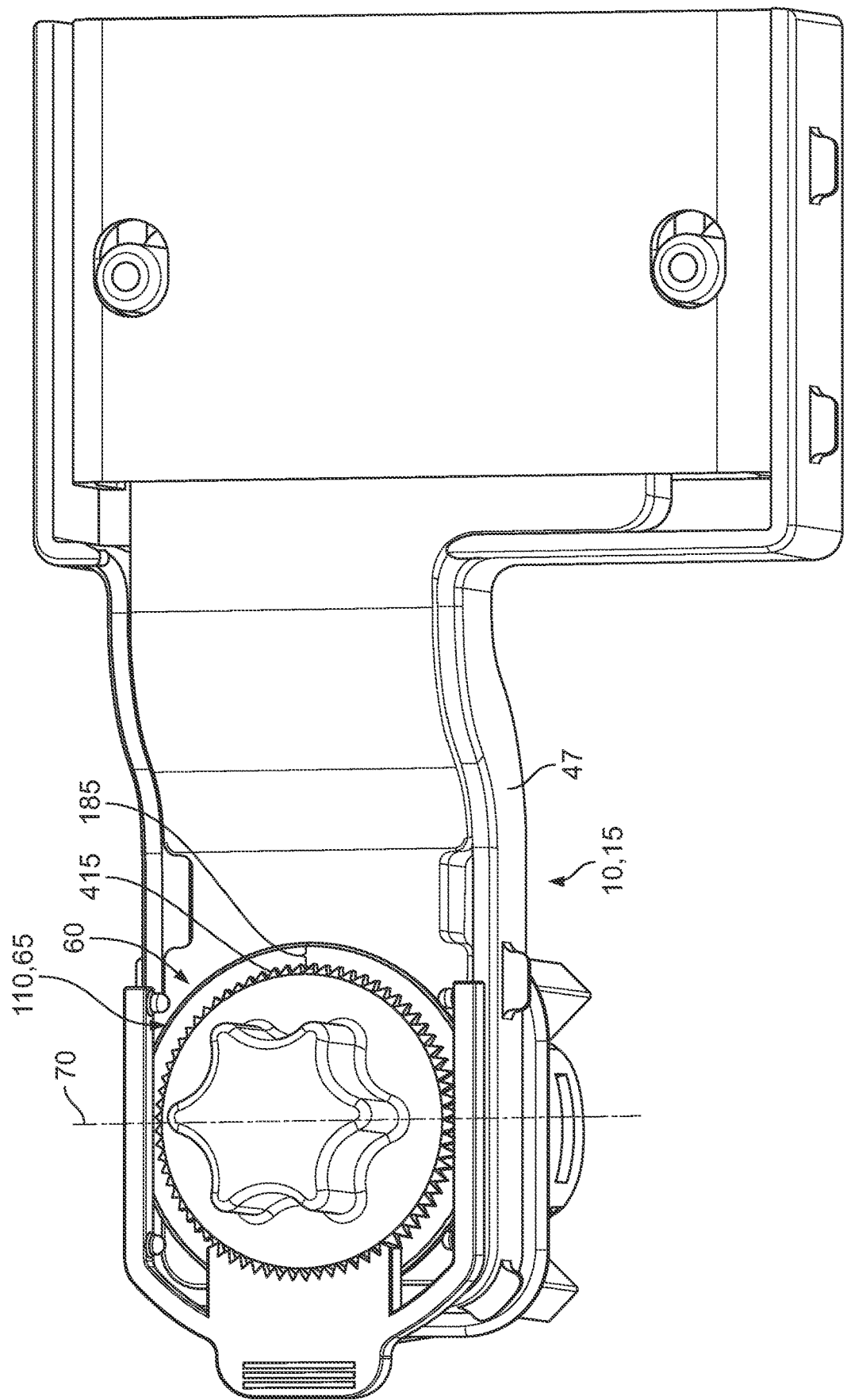
FIG. 24 is a perspective view of a contact system according to a seventh embodiment.

A contact system 10 according to a seventh embodiment, shown in FIG. 24, is configured substantially identically to the contact system 10 described in FIGS. 13 to 17. Only the differences in the contact system 10 shown in FIG. 24 compared to the contact system 10 shown in FIGS. 13 to 17 will be discussed hereinbelow.

In FIG. 24, the first housing part 46 is not shown for reasons of clarity. The screw 60 has an external toothing 415 on the screw head 65. The external toothing 415 is straight-toothed, for example, and is in the form of, for example, a spur gearing. The external toothing 415 adjoins the first bearing surface 185 radially on the inside. The first bearing surface 185 extends in a rotational plane relative to the screw axis 70. The first bearing surface 185 is arranged radially on the outside and adjoins a further outer circumferential side. The screw head profile 110 is arranged radially on the inside relative to the external toothing 415.

Figure 25:
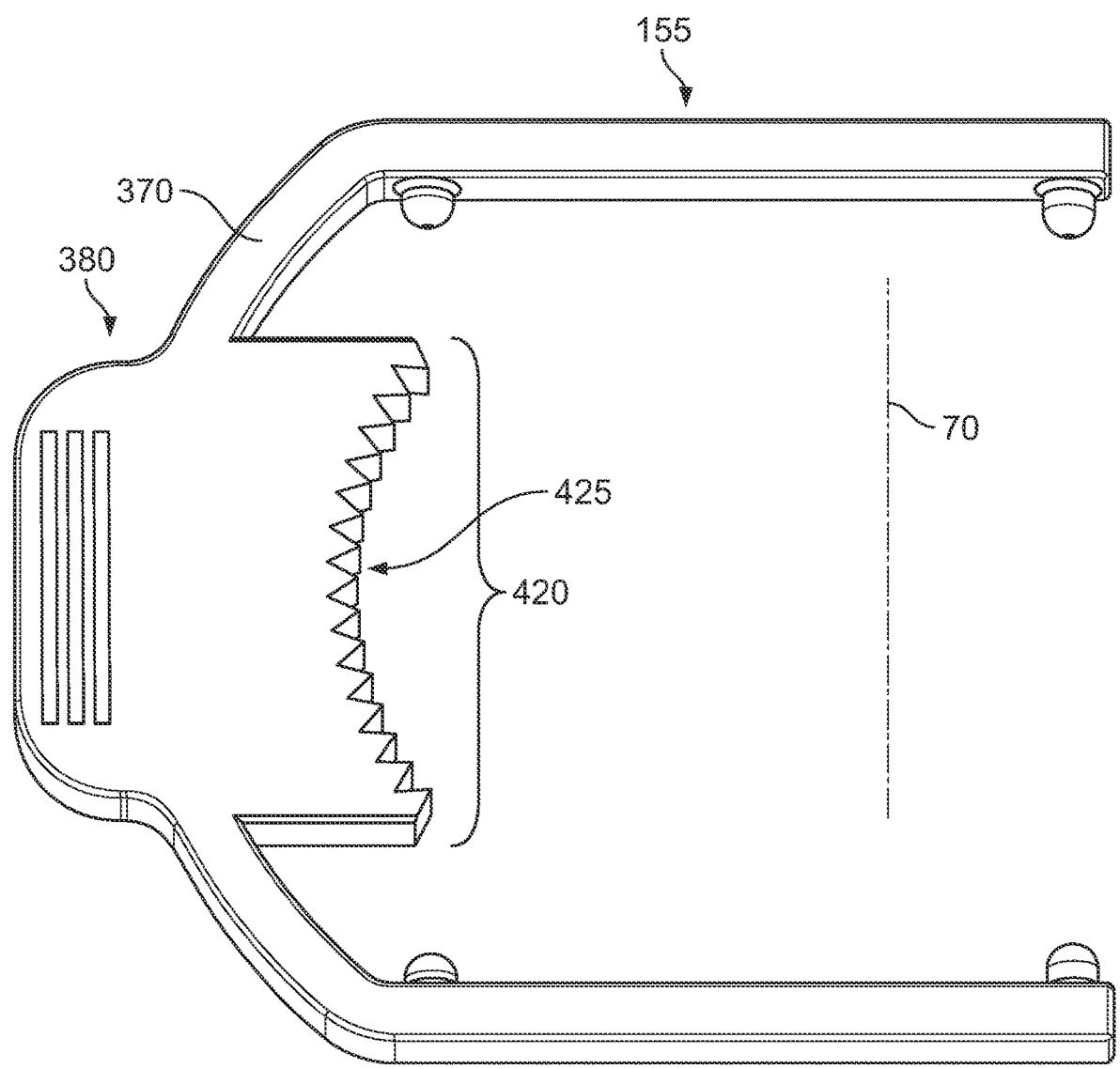
FIG. 25 is a perspective view of a holding device of the contact system of FIG. 24.

FIG. 25 is a perspective representation of the holding element 155 of the contact system 15 shown in FIG. 24. Radially on the inside, based on the screw axis 70, the holding element 155 has a web portion 420. The web portion 420 is arranged on a side of the second shackle portion 370 that is radially opposite the gripping portion 380. The web portion 420 extends radially inwards. Arranged on the web portion 420 is an internal toothing 425. The internal toothing 425 and the external toothing 415 are configured so that they correspond to one another. The internal toothing 425 extends on an arcuate portion around the screw axis 70.

In the assembled state of the contact system 10, the holding element 155 is pushed so far onto the screw 60 that the internal toothing 425 and the external toothing 415 engage with one another. As a result, the screw head 65 of the screw 60 is connected in a rotationally fixed manner to the holding element 155. The holding element 155 is connected in a rotationally fixed manner to the first housing part 46 by the engagement of the first and third shackle portion 365, 375 into the second housing opening 360. As a result, rotation of the screw 60 is prevented in an interlocking manner.

What is claimed is:

1. A contact device, comprising:
   a housing having a housing interior;
   a screw having a screw head and a shaft connected to the screw head, the shaft extending along a screw axis and having a first thread;
   a screw locking device connecting the screw head to the housing by a force-based and/or an interlocking engagement and preventing rotation of the screw in a direction of rotation about the screw axis, the screw locking device has a holding element with a receiver, the holding element has a catch spring formed radially outside a groove; and
   a first contact element for contacting a second contact element of a further contact device, the first contact element and the screw are arranged in the housing interior.

2. The contact device of claim 1, wherein the screw head has a screw head profile for attachment of a screw head drive and for initiating a torque about the screw axis, the receiver is complementary to the screw head profile, the screw head profile engages at least in part in the receiver and the holding element is coupled with the housing.

3. The contact device of claim 2, wherein the holding element has on an end face remote from the screw the groove extending around the screw axis.

4. The contact device of claim 3, wherein the housing has a closure element and a first housing part with a collar, the closure element has an engagement element extending around the screw axis, the engagement element engages into the groove and pushes the catch spring radially outwards in such a manner that the catch spring engages at least partially behind the collar.

5. The contact device of claim 1, wherein the housing has a first housing opening and a second housing opening, the screw head of the screw is accessible through the first housing opening, the second housing opening is arranged offset with respect to the first housing opening on an outer housing circumferential side of the housing, the second housing opening opens in the housing interior.

6. The contact device of claim 1, wherein the screw locking device has a clamping element, the clamping element is preloaded and provides a clamping force acting between the housing and the screw.

7. The contact device of claim 6, wherein the clamping element has a helical spring portion extending around the screw axis, the helical spring portion lies against the screw head at a first axial end of the helical spring portion, and the helical spring portion lies against the housing at an second axial end of the helical spring portion opposite the first axial end.

8. The contact device of claim 7, wherein the clamping force of the clamping element presses the screw head onto the first contact element in an axial direction.

9. A contact device, comprising:
   a housing having a housing interior;
   a screw having a screw head and a shaft connected to the screw head, the shaft extending along a screw axis and having a first thread;
   a screw locking device connecting the screw head to the housing by a force-based and/or an interlocking engagement and preventing rotation of the screw in a direction of rotation about the screw axis wherein the screw locking device has a holding element, the holding element is arranged on the outer housing circumferential side of the housing and extends at least in part through the second housing opening, the holding element lies at least in part on the screw head; and a first contact element for contacting a second contact element of a further contact device, the first contact element and the screw are arranged in the housing interior, the housing has a first housing opening and a second housing opening, the screw head of the screw is accessible through the first housing opening, the second housing opening is arranged offset with respect to the first housing opening on an outer housing circumferential side of the housing, the second housing opening opens in the housing interior.

10. The contact device of claim 9, wherein the second housing opening has a slot-like form and the screw head has a bearing surface at an end face of the screw head, the screw locking device has a further holding element with a first shackle portion having an elongate form, the first shackle portion is oriented tangentially to the screw axis and passes through the second housing opening.

11. The contact device of claim 9, wherein the holding element has an internal toothing and the screw head has an external toothing engaging with the internal toothing, the holding element is coupled in a rotationally fixed manner with the housing.

12. A contact device, comprising:
a housing having a housing interior;
a screw having a screw head and a shaft connected to the screw head, the shaft extending along a screw axis and having a first thread;
a screw locking device connecting the screw head to the housing by a force-based and/or an interlocking engagement and preventing rotation of the screw in a direction of rotation about the screw axis, the screw locking device has a clamping element, the clamping element is preloaded and provides a clamping force acting between the housing and the screw wherein the clamping element has a spiral spring portion in the form of a spiral, the spiral spring portion is coupled radially on an inside with the screw head, and the spiral spring portion is connected radially on an outside to the housing; and
a first contact element for contacting a second contact element of a further contact device, the first contact element and the screw are arranged in the housing interior.

13. The contact device of claim 12, wherein the spiral spring portion provides a locking torque acting about the screw axis, the locking torque is directed against a loosening torque for loosening the screw.

14. A contact device, comprising:
a housing having a housing interior in which the housing has a first housing part and a closure element, the closure element is connected by a torque-based connection to the first housing part;
a screw having a screw head and a shaft connected to the screw head, the shaft extending along a screw axis and having a first thread;
a screw locking device connecting the screw head to the housing by a force-based and/or an interlocking engagement and preventing rotation of the screw in a direction of rotation about the screw axis, the screw locking device has a clamping element, the clamping element is preloaded and provides a clamping force acting between the housing and the screw; and
a first contact element for contacting a second contact element of a further contact device, the first contact element and the screw are arranged in the housing interior.

15. The contact device of claim 14, wherein the first housing part delimits the housing interior, the closure element closes the housing interior, and the clamping element is arranged between the closure element and the holding element.

16. The contact device of claim 15, wherein the closure element has a plate portion oriented in a sloping manner relative to the screw axis, the clamping element is arranged axially between the holding element and the plate portion, the clamping force acts in an axial direction between the plate portion and the holding element.

17. The contact device of claim 16, wherein the closure element has a second housing opening and the first housing part has on an outside a protrusion which extends radially outwards.

18. The contact device of claim 17, wherein the screw locking device has a further holding element having a first shackle portion of elongate form, the first shackle portion is oriented tangentially to the screw axis and passes through the second housing opening and axially connects the closure element to the first housing part.

19. A contact system, comprising:
a contact device including a housing having a housing interior, a screw having a screw head and a shaft connected to the screw head, the shaft extending along a screw axis and having a first thread, a screw locking device connecting the screw head to the housing by a force-based and/or an interlocking engagement and preventing rotation of the screw in a direction of rotation about the screw axis, the screw locking device has a holding element which has on an end face remote from the screw a groove extending around the screw axis and a first contact element, the first contact element and the screw are arranged in the housing interior; and
a further contact device having a second contact element for contacting the first contact element and a threaded bush with a second thread, the shaft is screwed at least in part into the threaded bush and the first thread and the second thread engage with one another, the screw presses the first contact element against the second contact element for electrical contacting.

20. A method for assembling a contact system, comprising:
providing the contact system including a contact device and a further contact device, the contact device including a housing having a housing interior, a screw having a screw head and a shaft connected to the screw head, the shaft extending along a screw axis and having a first thread, a screw locking device connecting the screw head to the housing by a force-based and/or an interlocking engagement, and a first contact element, the first contact element and the screw are arranged in the housing interior, the further contact device having a second contact element for contacting the first contact element and a threaded bush with a second thread;
aligning the contact device and the further contact device relative to one another;
screwing the shaft into the threaded bush, the screw is tightened with a predefined torque in a first direction of rotation about the screw axis, the screw locking device has a holding element which has a catch spring formed radially outside a groove; and mounting the screw locking device, the screw locking device couples the screw head with the housing and prevents the screw from rotating in a second direction of rotation contrary to the first direction of rotation.

\* \* \* \* \*